(12) United States Patent
Tsunokawa

(10) Patent No.: US 12,131,732 B2
(45) Date of Patent: Oct. 29, 2024

(54) INFORMATION PROCESSING APPARATUS, INFORMATION PROCESSING SYSTEM, AND INFORMATION PROCESSING METHOD

(71) Applicant: SONY GROUP CORPORATION, Tokyo (JP)

(72) Inventor: Motoki Tsunokawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 621 days.

(21) Appl. No.: 17/311,832

(22) PCT Filed: Nov. 11, 2019

(86) PCT No.: PCT/JP2019/044179
§ 371 (c)(1),
(2) Date: Jun. 8, 2021

(87) PCT Pub. No.: WO2020/129465
PCT Pub. Date: Jun. 25, 2020

(65) Prior Publication Data
US 2022/0020371 A1 Jan. 20, 2022

(30) Foreign Application Priority Data
Dec. 17, 2018 (JP) .................. 2018-235393

(51) Int. Cl.
*G10L 15/22* (2006.01)
(52) U.S. Cl.
CPC ........ *G10L 15/22* (2013.01); *G10L 2015/225* (2013.01)
(58) Field of Classification Search
CPC ... G10L 2015/225; G10L 15/22; G06F 3/167; G06F 3/16; G06F 16/9035; H04L 51/02
See application file for complete search history.

(56) References Cited

U.S. PATENT DOCUMENTS

2011/0126119 A1* 5/2011 Young .................. G06F 3/048
715/744
2012/0290434 A1* 11/2012 Moritz ............... G06Q 30/0261
705/26.7
(Continued)

FOREIGN PATENT DOCUMENTS

CN 104424023 A 3/2015
JP 2014-138352 A 7/2014
(Continued)

OTHER PUBLICATIONS

International Search Report and Written Opinion of PCT Application No. PCT/JP2019/044179, issued on Dec. 10, 2019, 08 pages of ISRWO.

*Primary Examiner* — Huyen X Vo
(74) *Attorney, Agent, or Firm* — CHIP LAW GROUP

(57) ABSTRACT

There is provided a device and a method which executes application notification processing to a user at an optimum timing. User observation information is inputted, a context indicating a user situation is analyzed on the basis of input information, and notification processing of an application associated with a context is executed on the basis of an analysis result. The data processing unit determines the presence or absence of a causal relationship between multiple contexts, registers multiple contexts determined to have a causal relationship into a causal relationship information database, and executes notification processing of an application associated with a database registration context in a case where a context that is coincident with or similar to a cause context registered in the database is observed.

17 Claims, 24 Drawing Sheets

(56) References Cited

U.S. PATENT DOCUMENTS

| | | | | |
|---|---|---|---|---|
| 2014/0067730 A1* | 3/2014 | Kozloski | ................ | G16H 20/70 |
| | | | | 706/12 |
| 2015/0026824 A1* | 1/2015 | Kim | ................... | G06F 11/3058 |
| | | | | 726/28 |
| 2015/0074106 A1 | 3/2015 | Ji | | |
| 2016/0328452 A1* | 11/2016 | Nguyen | ................. | H04W 8/18 |

FOREIGN PATENT DOCUMENTS

| | | |
|---|---|---|
| JP | 2016-535369 A | 11/2016 |
| WO | 2015/038667 A2 | 3/2015 |

\* cited by examiner

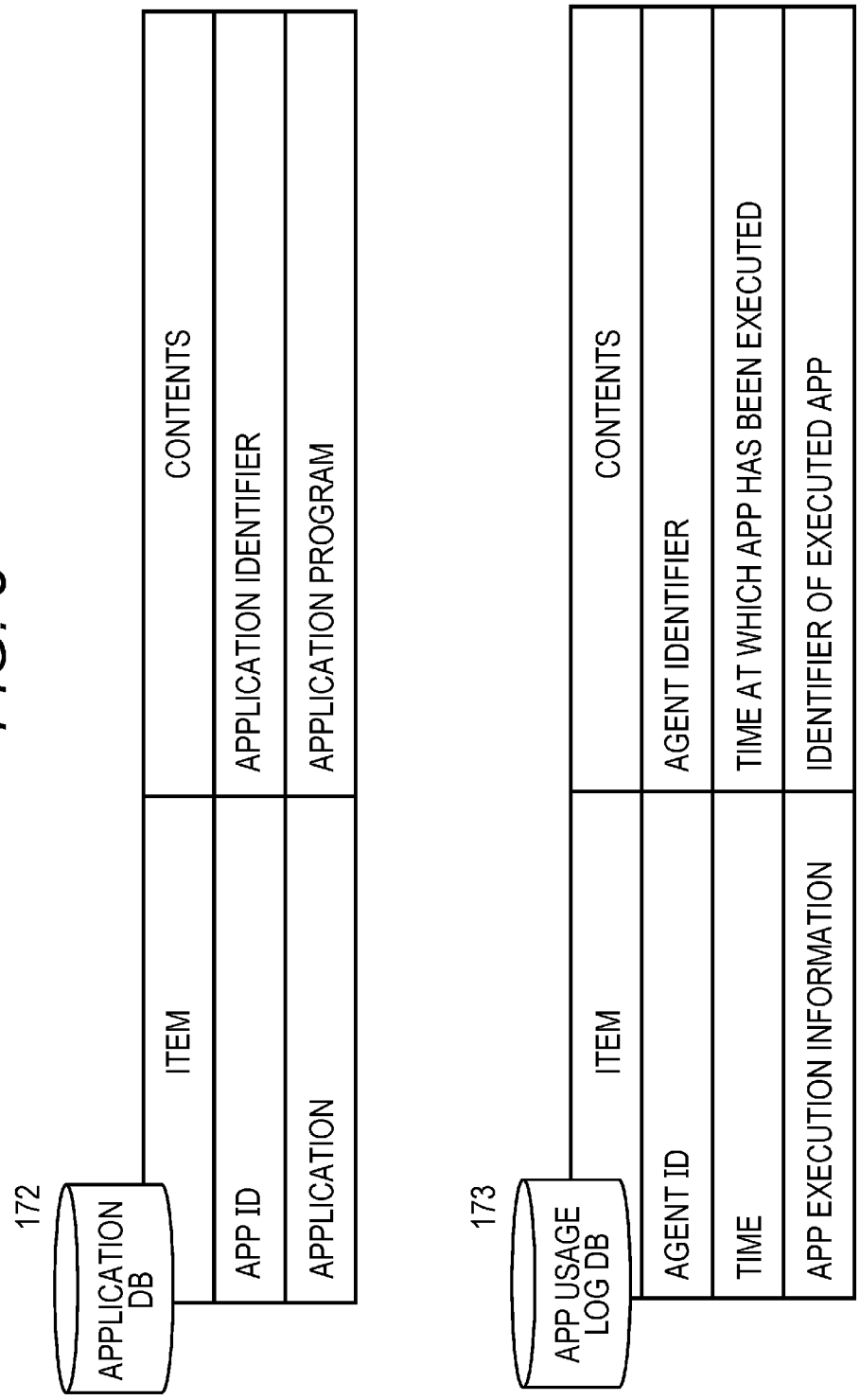

FIG. 9

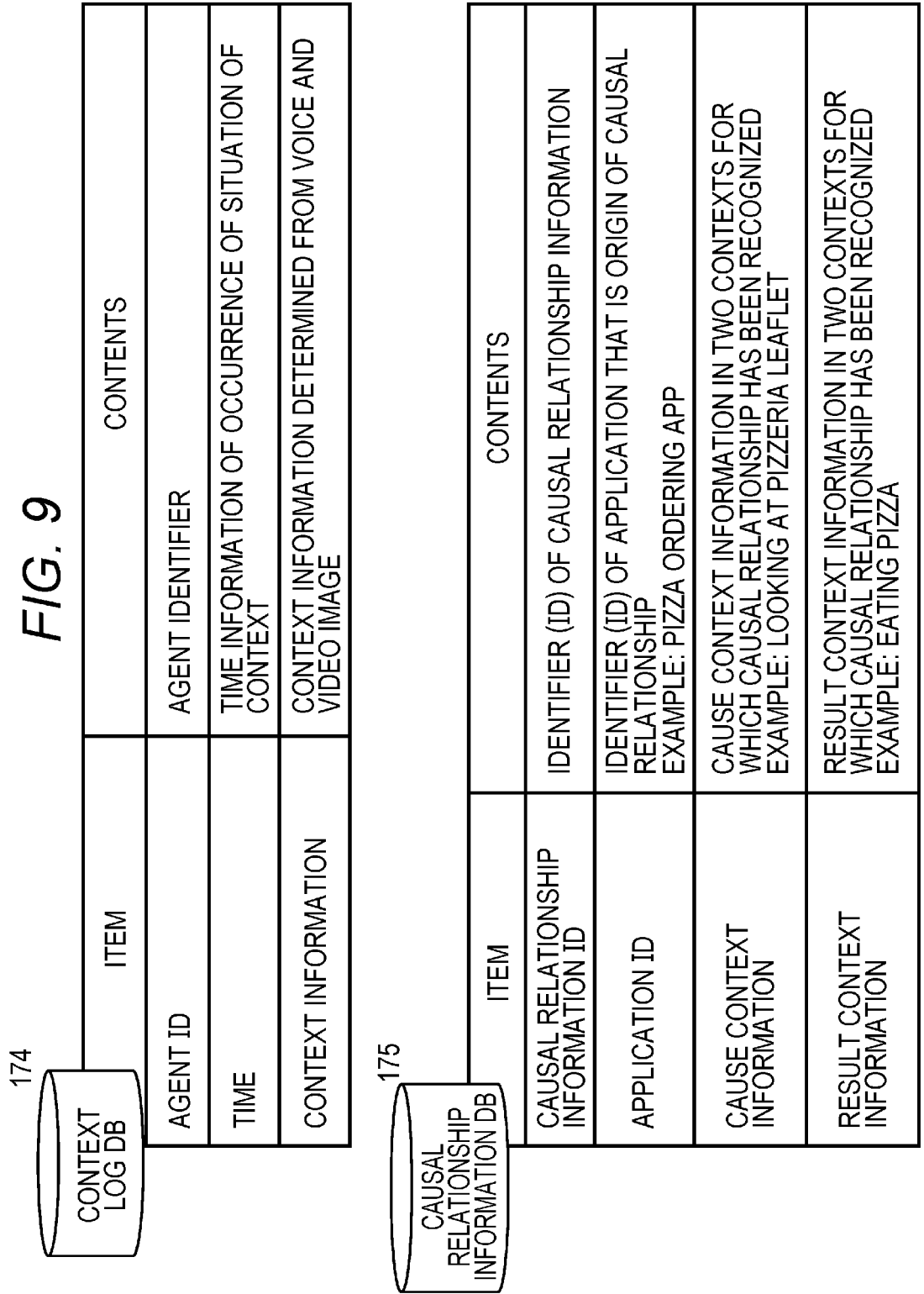

174 CONTEXT LOG DB

| ITEM | CONTENTS |
|---|---|
| AGENT ID | AGENT IDENTIFIER |
| TIME | TIME INFORMATION OF OCCURRENCE OF SITUATION OF CONTEXT |
| CONTEXT INFORMATION | CONTEXT INFORMATION DETERMINED FROM VOICE AND VIDEO IMAGE |

175 CAUSAL RELATIONSHIP INFORMATION DB

| ITEM | CONTENTS |
|---|---|
| CAUSAL RELATIONSHIP INFORMATION ID | IDENTIFIER (ID) OF CAUSAL RELATIONSHIP INFORMATION |
| APPLICATION ID | IDENTIFIER (ID) OF APPLICATION THAT IS ORIGIN OF CAUSAL RELATIONSHIP<br>EXAMPLE: PIZZA ORDERING APP |
| CAUSE CONTEXT INFORMATION | CAUSE CONTEXT INFORMATION IN TWO CONTEXTS FOR WHICH CAUSAL RELATIONSHIP HAS BEEN RECOGNIZED<br>EXAMPLE: LOOKING AT PIZZERIA LEAFLET |
| RESULT CONTEXT INFORMATION | RESULT CONTEXT INFORMATION IN TWO CONTEXTS FOR WHICH CAUSAL RELATIONSHIP HAS BEEN RECOGNIZED<br>EXAMPLE: EATING PIZZA |

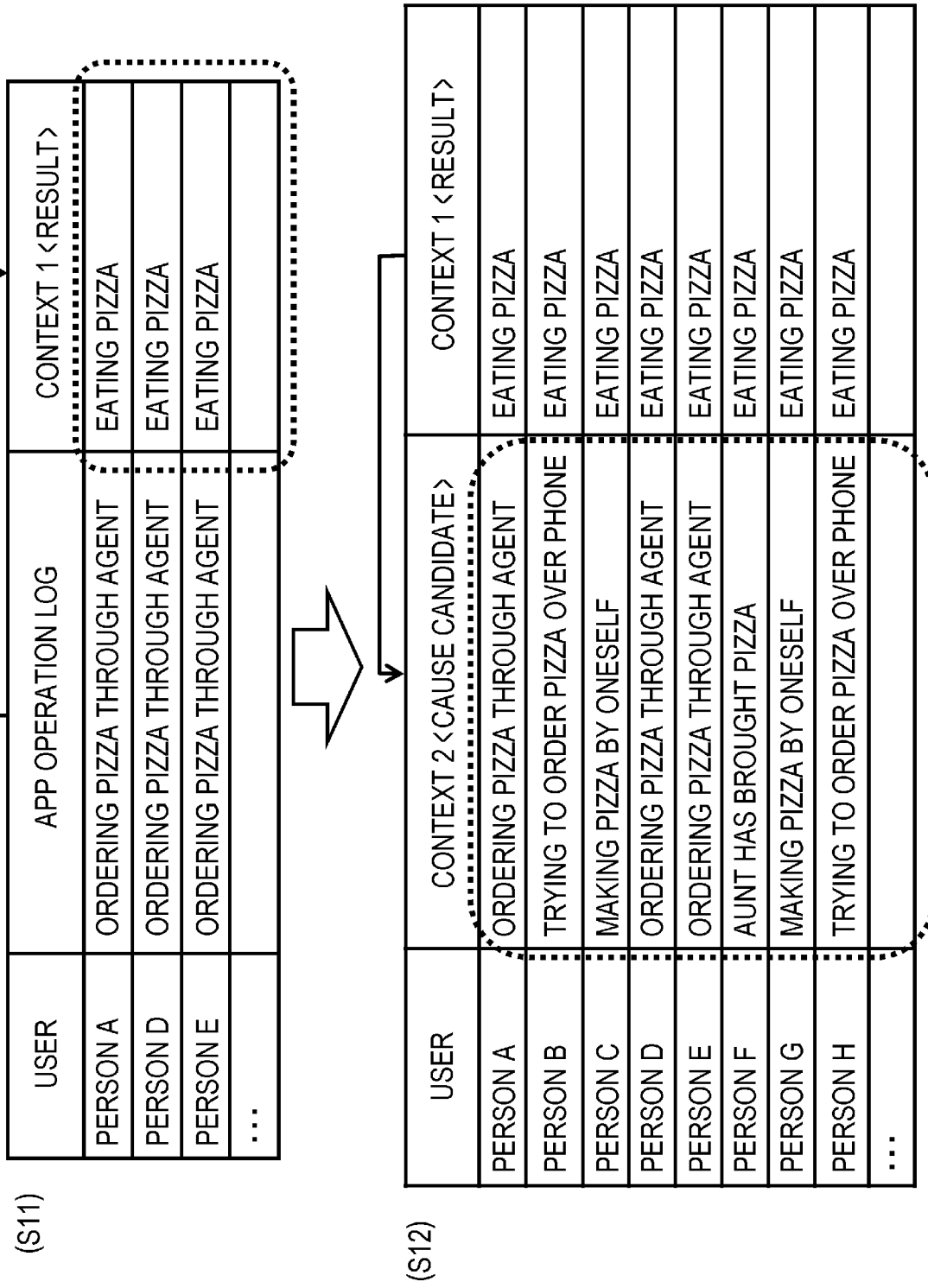

FIG. 11

(S13)

| USER TYPE | <CAUSE CANDIDATE> | <RESULT> | NUMBER OF PEOPLE |
|---|---|---|---|
| TYPE 1 | TRYING TO ORDER PIZZA OVER PHONE | EATING PIZZA | 200 |
| TYPE 2 | MAKING PIZZA BY ONESELF | EATING PIZZA | 100 |
| TYPE 3 | AUNT HAS BROUGHT GIFT | EATING PIZZA | 10 |
| ... | | | |

(S14)

| USER TYPE | <CAUSE CANDIDATE> | <RESULT> | PROBABILITY THAT RESULT OCCURS AFTER CAUSE CANDIDATE |
|---|---|---|---|
| TYPE 1 | TRYING TO ORDER PIZZA OVER PHONE | EATING PIZZA | 95% |
| TYPE 2 | MAKING PIZZA BY ONESELF | EATING PIZZA | 98% |
| TYPE 3 | AUNT HAS BROUGHT GIFT | EATING PIZZA | 8% |
| ... | | | |

| USER TYPE | <CAUSE> | <RESULT> |
|---|---|---|
| TYPE 1 | TRYING TO ORDER PIZZA OVER PHONE | EATING PIZZA |
| TYPE 2 | MAKING PIZZA BY ONESELF | EATING PIZZA |
| ... | | |

(S21)

| USER | <CAUSE CANDIDATE 2> | <RESULT>/<CAUSE> |
|---|---|---|
| PERSON B | LOOKING AT PIZZERIA LEAFLET | TRYING TO ORDER PIZZA OVER PHONE |
| PERSON C | OPENING REFRIGERATOR | MAKING PIZZA BY ONESELF |
| PERSON G | LOOKING AT PIZZERIA LEAFLET | MAKING PIZZA BY ONESELF |
| PERSON H | LOOKING AT PIZZERIA LEAFLET | TRYING TO ORDER PIZZA OVER PHONE |
| ... | | |

| USER TYPE | <CAUSE CANDIDATE 2> | <RESULT>/<CAUSE> | PROBABILITY THAT RESULT OCCURS AFTER CAUSE CANDIDATE |
|---|---|---|---|
| TYPE 1 | LOOKING AT PIZZERIA LEAFLET | TRYING TO ORDER PIZZA OVER PHONE | 82% |
| TYPE 2 | LOOKING AT PIZZERIA LEAFLET | MAKING PIZZA BY ONESELF | 15% |
| TYPE 3 | OPENING REFRIGERATOR | TRYING TO ORDER PIZZA OVER PHONE | 0.3% |
| TYPE 4 | OPENING REFRIGERATOR | MAKING PIZZA BY ONESELF | 2% |
| ... | | | |

(S23)

| USER TYPE | <CAUSE CANDIDATE 2> | <RESULT>/<CAUSE> | PROBABILITY THAT RESULT OCCURS AFTER CAUSE CANDIDATE |
|---|---|---|---|
| TYPE 1 | LOOKING AT PIZZERIA LEAFLET | TRYING TO ORDER PIZZA OVER PHONE | 82% |

| USER | <CAUSE CANDIDATE 2> | <RESULT 2>/<CAUSE CANDIDATE 1> | <RESULT 1> |
|---|---|---|---|
| PERSON A | LOOKING AT PIZZERIA LEAFLET | ORDERING PIZZA THROUGH AGENT | EATING PIZZA |
| PERSON B | LOOKING AT PIZZERIA LEAFLET | TRYING TO ORDER PIZZA OVER PHONE | EATING PIZZA |
| PERSON C | OPENING REFRIGERATOR | MAKING PIZZA BY ONESELF | EATING PIZZA |
| PERSON D | LOOKING AT PIZZERIA LEAFLET | ORDERING PIZZA THROUGH AGENT | EATING PIZZA |
| PERSON E | LOOKING AT PIZZERIA LEAFLET | ORDERING PIZZA THROUGH AGENT | EATING PIZZA |
| PERSON F | THERE WAS PHONE CALL FROM AUNT | AUNT HAS BROUGHT PIZZA | EATING PIZZA |
| PERSON G | OPENING REFRIGERATOR | MAKING PIZZA BY ONESELF | EATING PIZZA |
| PERSON H | LOOKING AT PIZZERIA LEAFLET | TRYING TO ORDER PIZZA OVER PHONE | EATING PIZZA |
| ... | | | |

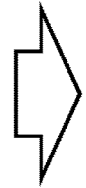

(S25)

| ITEM | CONTENTS |
|---|---|
| CAUSAL RELATIONSHIP INFORMATION ID | 3210 |
| APPLICATION ID | A001 (=PIZZA ORDERING APP) |
| CAUSE CONTEXT INFORMATION | LOOKING AT PIZZERIA LEAFLET |
| RESULT CONTEXT INFORMATION | EATING PIZZA |

(1) AGENT – USER – USER PROFILE, CORRESPONDENCE DATA

| ITEM | CONTENTS |
|---|---|
| AGENT ID | E0001 |
| USER ID | U1234 |
| USER PROFILE | USER ATTRIBUTE INFORMATION=USER LIKES PIZZA |

(2) USER-CAUSAL RELATIONSHIP INFORMATION – APPLICATION – NOTIFICATION SCORE, CORRESPONDENCE DATA

| ITEM | CONTENTS |
|---|---|
| USER ID | U1234 |
| CAUSAL RELATIONSHIP INFORMATION ID | 3210 |
| APPLICATION ID | A001 (=PIZZA ORDERING APP) |
| NOTIFICATION SCORE | 85 |

FIG. 20

| USER | CAUSE 1 | RESULT 1/CAUSE 2 | RESULT 2 |
|---|---|---|---|
| PERSON A | TEMPERATURE 30 DEGREES | ACTIVATING AIR CONDITIONER THROUGH AGENT | AIR CONDITIONER IS ACTIVATED |
| PERSON B | TEMPERATURE 31 DEGREES | ACTIVATING AIR CONDITIONER THROUGH AGENT | AIR CONDITIONER IS ACTIVATED |
| PERSON C | TEMPERATURE 35 DEGREES | ACTIVATING AIR CONDITIONER BY ONESELF | AIR CONDITIONER IS ACTIVATED |
| PERSON D | TEMPERATURE 28 DEGREES | ACTIVATING AIR CONDITIONER THROUGH AGENT | AIR CONDITIONER IS ACTIVATED |
| PERSON E | TEMPERATURE 29 DEGREES | ACTIVATING AIR CONDITIONER THROUGH AGENT | AIR CONDITIONER IS ACTIVATED |
| PERSON F | TEMPERATURE 32 DEGREES | ACTIVATING AIR CONDITIONER THROUGH AGENT | AIR CONDITIONER IS ACTIVATED |
| PERSON G | TEMPERATURE 30 DEGREES | ACTIVATING AIR CONDITIONER BY ONESELF | AIR CONDITIONER IS ACTIVATED |
| PERSON H | TEMPERATURE 29 DEGREES | ACTIVATING AIR CONDITIONER BY ONESELF | AIR CONDITIONER IS ACTIVATED |
| ⋮ | | | |

FIG. 22

| USER | CAUSE 1 | RESULT 1/CAUSE 2 | RESULT 2 |
|---|---|---|---|
| PERSON A | GPS: AROUND 50m BEFORE SHIBUYA OF METROPOLITAN EXPRESSWAY<br>ACCELERATION SENSOR: MOVING AT 20km/H | CHECKING ROAD CONDITIONS WITH AGENT | CHECKING ROAD CONDITIONS |
| PERSON B | GPS: AROUND 200m AFTER PASSING SHINJUKU OF METROPOLITAN EXPRESSWAY<br>ACCELERATION SENSOR: MOVING AT 5km/H | CHECKING ROAD CONDITIONS WITH AGENT | CHECKING ROAD CONDITIONS |
| PERSON C | GPS: AROUND 100m BEFORE SHIBUYA OF METROPOLITAN EXPRESSWAY<br>ACCELERATION SENSOR: MOVING AT 10km/H | CHECKING ROAD CONDITIONS WITH RADIO | CHECKING ROAD CONDITIONS |
| PERSON D | GPS: AROUND 80m AFTER PASSING SHIBUYA OF METROPOLITAN EXPRESSWAY<br>ACCELERATION SENSOR: MOVING AT 8km/H | CHECKING ROAD CONDITIONS WITH RADIO | CHECKING ROAD CONDITIONS |
| ⋮ | | | |

FIG. 23

| USER TYPE | CAUSE 1 | RESULT 2 | NUMBER OF PEOPLE |
|---|---|---|---|
| TYPE 1 | GPS: AROUND SHIBUYA OF METROPOLITAN EXPRESSWAY ACCELERATION SENSOR: MOVING SLOWLY | CHECKING ROAD CONDITIONS | 400 |
| TYPE 2 | GPS: AROUND SHINJUKU OF METROPOLITAN EXPRESSWAY ACCELERATION SENSOR: MOVING SLOWLY | CHECKING ROAD CONDITIONS | 100 |
| ... | | | |

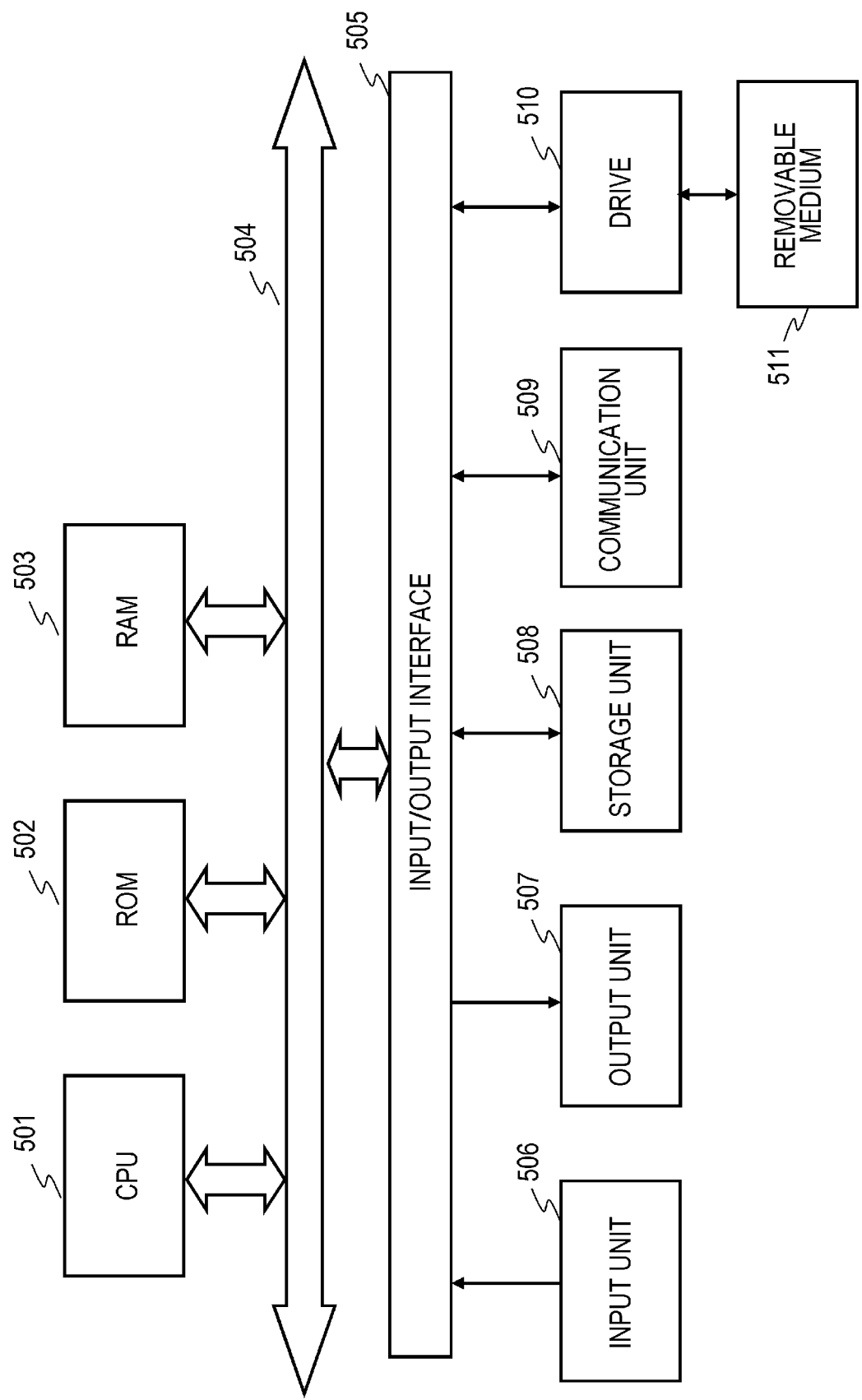

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2019/044179 filed on Nov. 11, 2019, which claims priority benefit of Japanese Patent Application No. JP 2018-235393 filed in the Japan Patent Office on Dec. 17, 2018. Each of the above-referenced applications is hereby incorporated herein by reference in its entirety.

TECHNICAL FIELD

The present disclosure relates to an information processing apparatus, an information processing system, an information processing method, and a program. More specifically, the present invention relates to an information processing apparatus, an information processing system, an information processing method, and a program that execute a process and a response according to a user utterance.

BACKGROUND ART

In recent years, there is an increase of making use of voice dialogue systems that perform voice recognition of user utterances and perform a variety of processes and responses based on recognition results.

In this voice recognition system, a user utterance inputted via a microphone is analyzed, and a process according to an analysis result is performed.

For example, in a case where a user utters "Tell me the weather tomorrow", weather information is acquired from a weather information providing server, a system response based on the acquired information is generated, and the generated response is outputted from a speaker. Specifically, for example, system utterance="Tomorrow's weather will be sunny. However, there may be thunderstorms in the evening", such a system utterance is outputted.

A device that enables dialogue with a user in this way is called, for example, a smart speaker, an agent (device), or the like.

Agents of recent years can execute a variety of applications such as weather forecasting, playing music, ordering pizza, and the like. While the number of available applications (apps) is increasing, there are some agents that can use, for example, more than tens of thousands of applications.

As the number of available apps increases in this way, there are many apps that users do not know. For example, in a case where a pizza voice ordering app is available in a user-owned agent but the user does not know existence of the app, the user is to order pizza over the phone, which requires time and effort.

Furthermore, even if a company side that provides applications has developed an app that allows ordering pizza through voice, the application will not be used, and a loss of opportunity is caused if user's recognition is low.

It is possible to notify the user about a new app when the agent becomes available to the new application. However, if the number of times is large, the notification is likely to be forgotten and also likely to be noisy.

Note that there is Patent Document 1 (Japanese Patent Application Laid-Open No. 2014-138352) as prior art that discloses an agent that provides information to a user with a push type.

This document 1 discloses a configuration to estimate information required by a user in accordance with a situation of the user, and provide the information.

However, this document discloses a configuration to select and provide information that can be provided by an app that is normally used by the user in accordance with a user situation, and there is no notification about information regarding apps that are not used by the user.

CITATION LIST

Patent Document

Patent Document 1: Japanese Patent Application Laid-Open No. 2014-138352

SUMMARY OF THE INVENTION

Problems to be Solved by the Invention

The present disclosure has been made in view of the problems described above, for example, and an object thereof is to provide an information processing apparatus, an information processing system, an information processing method, and a program that can notify a user of an optimum application that can be used, in accordance with a situation of the user.

Solutions to Problems

A first aspect of the present disclosure is
an information processing apparatus having:
a data processing unit configured to input user observation information and analyze a context indicating a user situation on the basis of input information, in which
the data processing unit
executes, on the basis of an analysis result of the context, notification processing of an application associated with a context.
Moreover, a second aspect of the present disclosure is
an information processing system having a user terminal and a data processing server, in which
the user terminal
has an input unit configured to acquire user observation information, and
the data processing server
analyzes a context indicating a user situation on the basis of user observation information received from the user terminal, and transmits notification data of an application associated with a context to the user terminal, on the basis of an analysis result.
Moreover, a third aspect of the present disclosure is
an information processing method that is executed in an information processing apparatus, the information processing method including:
by a data processing unit, inputting user observation information and analyzing a context indicating a user situation on the basis of input information, and
executing, on the basis of an analysis result of the context, notification processing of an application associated with a context.

Moreover, a fourth aspect of the present disclosure is
an information processing method executed in an information processing system having a user terminal and a data processing server, the information processing method including:
by the user terminal, acquiring user observation information and transmitting to the data processing server; and
by the data processing server,
analyzing a context indicating a user situation on the basis of user observation information received from the user terminal, and transmitting notification data of an application associated with a context to the user terminal, on the basis of an analysis result.

Moreover, a fifth aspect of the present disclosure is
a program for execution of information processing in an information processing apparatus, the program causing:
a data processing unit to input user observation information and analyze a context indicating a user situation on the basis of input information; and
the data processing unit to execute, on the basis of an analysis result of the context, notification processing of an application associated with a context.

Note that the program of the present disclosure is, for example, a program that can be provided by a storage medium or a communication medium that provides a variety of program codes in a computer-readable format, to an information processing apparatus or a computer system capable of executing the program codes. By providing such a program in a computer-readable format, processing corresponding to the program is realized on the information processing apparatus or the computer system.

Still other objects, features, and advantages of the present disclosure will become apparent from the more detailed description based on the embodiment of the present disclosure as described later and the attached drawings. Note that a system in this specification is a logical set configuration of a plurality of devices, and is not limited to one in which a device of each configuration is in a same casing.

Effects of the Invention

According to a configuration of one embodiment of the present disclosure, there are realized a device and a method capable of executing notification processing of an application to a user at an optimum timing.

Specifically, for example, user observation information is inputted, a context indicating a user situation is analyzed on the basis of input information, and notification processing of an application associated with a context is executed on the basis of an analysis result. The data processing unit determines the presence or absence of a causal relationship between multiple contexts, registers multiple contexts determined to have a causal relationship into a causal relationship information database, and executes notification processing of an application associated with a database registration context in a case where a context that is coincident with or similar to a cause context registered in the database is observed.

This configuration realizes a device and a method capable of executing notification processing of an application to a user at an optimum timing.

Note that the effects described in this specification are merely examples and are not limited, and additional effects may be present.

BRIEF DESCRIPTION OF DRAWINGS

FIG. 8 is a view for explaining a specific example of stored data in an application DB and an app usage log DB.

FIG. 9 is a view for explaining a specific example of stored data in a context log DB and a causal relationship information DB.

FIG. 10 is a view for explaining an example of context analysis processing executed as a process of the present disclosure.

FIG. 11 is a view for explaining an example of the context analysis processing executed as a process of the present disclosure.

FIG. 13 is a view for explaining an example of the context analysis processing executed as a process of the present disclosure.

FIG. 14 is a view for explaining an example of the context analysis processing executed as a process of the present disclosure.

FIG. 15 is a view for explaining an example of the context analysis processing executed as a process of the present disclosure.

FIG. 16 is a view for explaining an example of the context analysis processing executed as a process of the present disclosure.

FIG. 20 is a view for explaining an example of context analysis data using detection information of a temperature sensor.

FIG. 22 is a view for explaining an example of context analysis data using detection information of a GPS sensor or the like.

FIG. 23 is a view for explaining an example of context analysis data using detection information of the GPS sensor or the like.

FIG. 24 is a diagram for explaining an example of a hardware configuration of the information processing apparatus.

MODE FOR CARRYING OUT THE INVENTION

Figure 1:
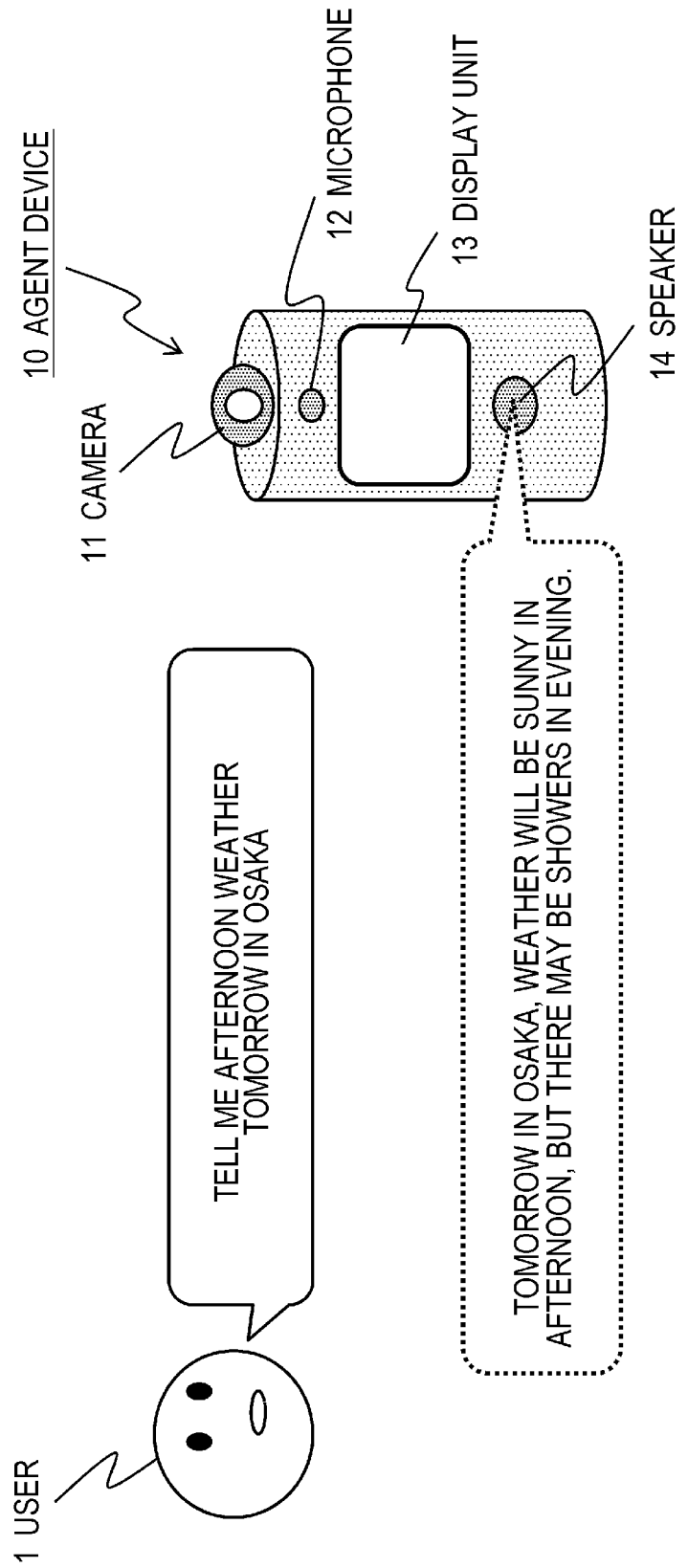
FIG. 1 is a view for explaining an example of an information processing apparatus that performs a response or a process based on a user utterance.

Hereinafter, with reference to the drawings, an information processing apparatus, an information processing system, an information processing method, and a program of the present disclosure will be described. Note that the description will be made in accordance with the following items.

1. About outline of process executed by information processing apparatus
2. About stored data configuration of database in storage unit
3. About details of context causal relationship determination processing based on context analysis
4. About context analysis processing example in case where causal relationship is linked to three or more contexts
5. About sequence of process executed by data processing unit
5-1. (Process 1) Process of determining presence or absence of causal relationship between multiple contexts on basis of context analysis, and registering context for which causal relationship has been confirmed, into causal relationship information DB
5-2. (Process 2) Process of executing app existence notification to user on basis of context analysis and registration data reference of causal relationship information DB
5-3. (Process 3) Process of determining whether or not to execute app existence notification to user on basis of notification score
6. About other embodiments
7. About hardware configuration example of information processing apparatus
8. Summary of configuration of present disclosure

1. About Outline of Process Executed by Information Processing Apparatus

First, with reference to FIG. 1 and the subsequent figures, an outline of a process executed by an information processing apparatus of the present disclosure will be described.

FIG. 1 is a view showing a processing example of an agent device 10 configured to recognize a user utterance of a user 1 and make a response.

The agent device 10 executes voice recognition processing on a user utterance, for example, this user utterance, user utterance="Tell me the afternoon weather tomorrow in Osaka".

Moreover, the agent device 10 executes a process based on a voice recognition result of the user utterance.

In the example shown in FIG. 1, the agent device 10 acquires data for responding to the user utterance="Tell me the afternoon weather tomorrow in Osaka", generates a response on the basis of the acquired data, and outputs the generated response via a speaker 14.

In the example shown in FIG. 1, the agent device 10 makes the following system response.

System response="Tomorrow in Osaka, the weather will be sunny in the afternoon, but there may be showers in the evening."

The agent device 10 executes voice synthesis processing (text to speech: TTS) to generate and output the system response described above.

The agent device 10 generates and outputs a response by using knowledge data acquired from a storage unit in the device or knowledge data acquired via a network.

The agent device 10 shown in FIG. 1 includes a camera 11, a microphone 12, a display unit 13, and the speaker 14, and has a configuration capable of voice input/output and image input/output.

The agent device 10 shown in FIG. 1 is called, for example, a smart speaker or an agent.

Note that a configuration may be adopted in which the voice recognition processing and semantic analysis processing for the user utterance are performed in the agent device 10, or executed in a data processing server that is one of servers 20 on a cloud side.

Figure 2:
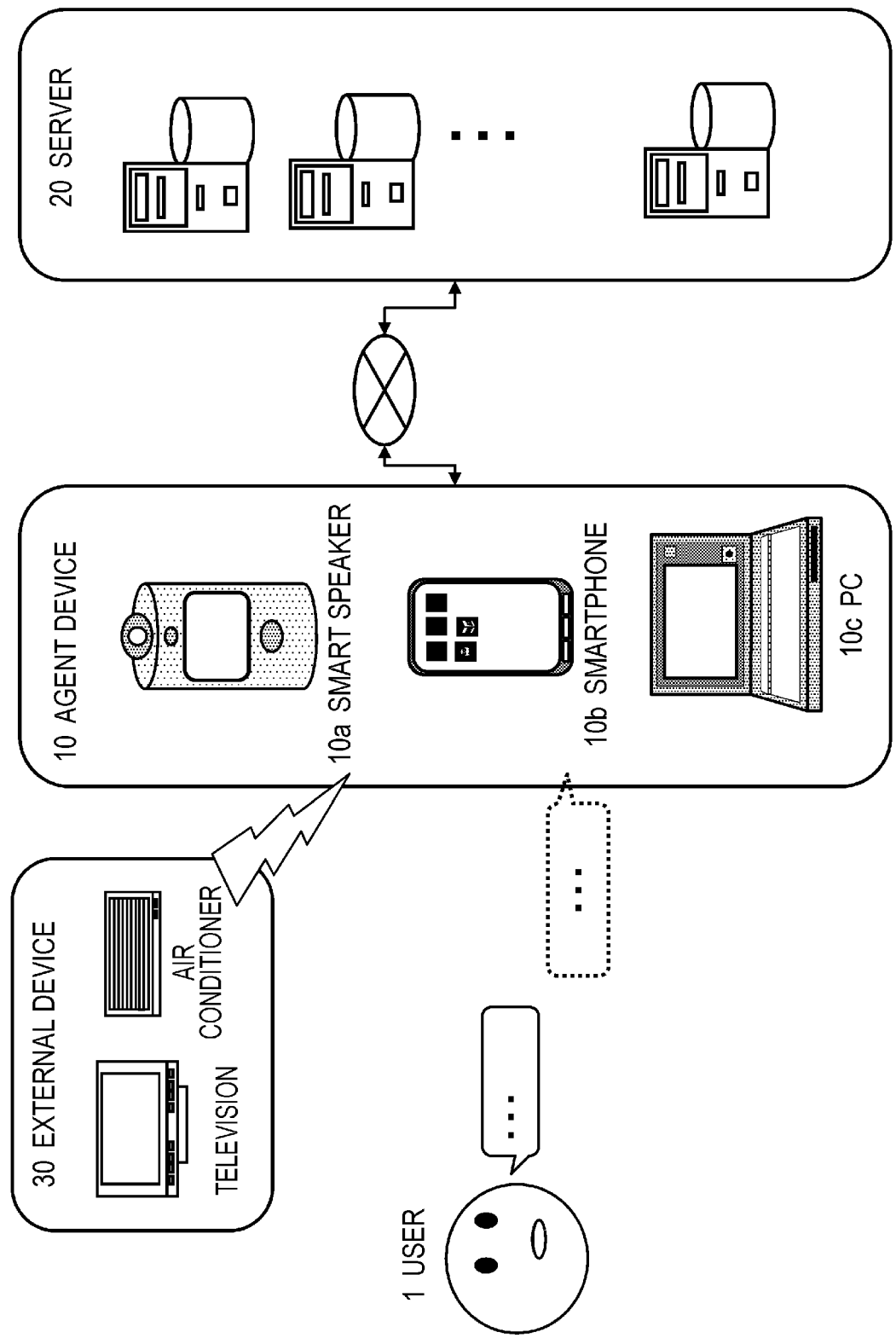
FIG. 2 is a diagram for explaining a configuration example and a usage example of the information processing apparatus.

As shown in FIG. 2, the agent device 10 of the present disclosure is not limited to a smart speaker 10a, and may have a variety of device forms such as a smartphone 10b and a PC 10c.

In addition to recognizing an utterance of the user 1, and making a response based on the utterance of the user, the agent device 10 also executes, for example, control of an external device 30 such as a television and an air conditioner shown in FIG. 2 in accordance with the user utterance.

For example, in a case where the user utterance is a request such as "change the TV channel to 1" or "set the temperature of the air conditioner to 20 degrees", the agent device 10 outputs a control signal (Wi-Fi, infrared light, and the like) to the external device 30 to execute control according to the user utterance on the basis of a voice recognition result of this user utterance.

Note that the agent device 10 is connected to the server 20 via a network, and can acquire information necessary for generating a response to a user utterance from the server 20. Furthermore, as described above, a configuration may be adopted in which the server performs the voice recognition processing and the semantic analysis processing.

Next, with reference to FIG. 3, a specific configuration example of the information processing apparatus will be described.

Figure 3:
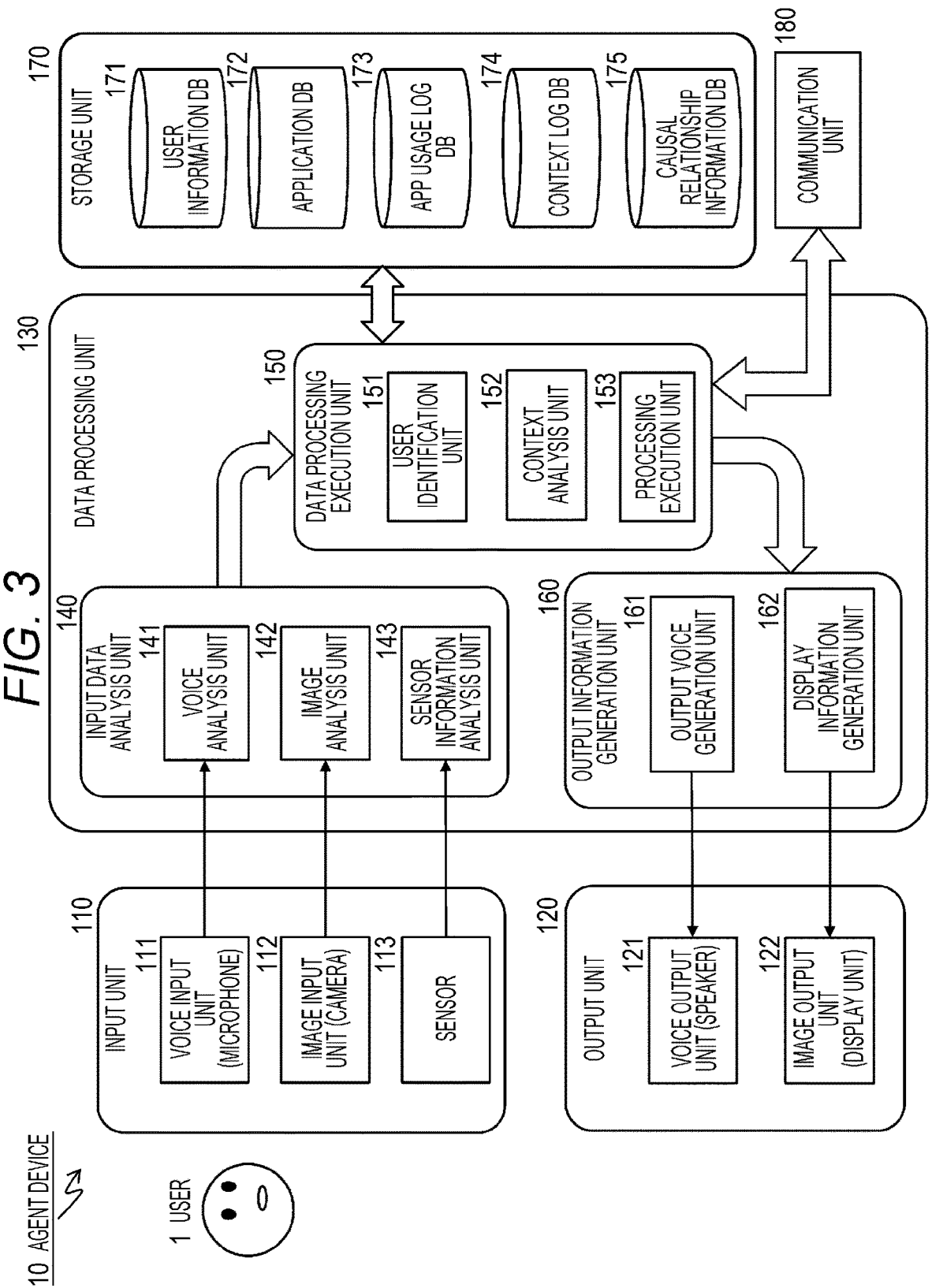
FIG. 3 is a diagram for explaining a specific configuration example of the information processing apparatus.

FIG. 3 is a diagram showing a configuration example of the agent device 10 configured to recognize a user utterance and perform a process and a response corresponding to the user utterance.

As shown in FIG. 3, the agent device 10 includes an input unit 110, an output unit 120, a data processing unit 130, a storage unit 170, and a communication unit 180.

The data processing unit 130 includes an input data analysis unit 140, a data processing execution unit 150, and an output information generation unit 160.

Furthermore, the storage unit 170 has a user information database (DB) 171, an application DB 172, an app usage log DB 173, a context log DB 174, and a causal information DB 175.

Note that the data processing unit 130, the storage unit 170, and the like other than the input unit 110 and the output unit 120 may be configured in an external server instead of being configured in the agent device 10. In a case of a configuration using a server, the agent device 10 transmits input data inputted from the input unit 110 to the server via a network, receives a processing result of the day processing unit 130 of the server, and outputs via the output unit 120.

Next, components of the agent device 10 shown in FIG. 3 will be described.

The input unit 110 includes a voice input unit (a microphone) 111, an image input unit (a camera) 112, and a sensor 113.

The output unit 120 includes a voice output unit (a speaker) 121 and an image output unit (a display unit) 122.

The agent device 10 has these components at minimum.

Note that the voice input unit (the microphone) 111 corresponds to the microphone 12 of the agent device 10 shown in FIG. 1.

The image input unit (the camera) 112 corresponds to the camera 11 of the agent device 10 shown in FIG. 1.

The sensor 113 includes a variety of sensors such as, for example, a position sensor such as GPS, a temperature sensor, and the like.

The voice output unit (the speaker) 121 corresponds to the speaker 14 of the agent device 10 shown in FIG. 1.

The image output unit (the display unit) 122 corresponds to the display unit 13 of the agent device 10 shown in FIG. 1.

Note that the image output unit (the display unit) 122 can be configured by, for example, a projector or the like, or can be configured by using a display unit of a television of an external device.

The data processing unit 130 includes an input data analysis unit 140, a data processing execution unit 150, and an output information generation unit 160.

The input data analysis unit 140 includes a voice analysis unit 141, an image analysis unit 142, and a sensor information analysis unit 14.

The output information generation unit 160 includes an output voice generation unit 161 and a display information generation unit 162.

User utterance voice is inputted to the voice input unit 111 such as a microphone.

The voice input unit (the microphone) 111 inputs the inputted user utterance voice to the voice analysis unit 141.

The voice analysis unit 141 has, for example, an automatic speech recognition (ASR) function, and converts voice data into text data including a plurality of words.

The voice analysis unit 141 further executes utterance semantic analysis processing for the text data. The voice analysis unit 141 has, for example, a natural language understanding function such as natural language understanding (NLU), and estimates, from the text data, intention (Intent) of the user utterance and entity information (Entity) that is an element having a meaning (a meaningful element) included in the utterance. When the intention (Intent) and the entity information (Entity) can be accurately estimated and acquired from the user utterance, the agent device 10 can perform accurate processing for the user utterance.

An analysis result of the voice analysis unit 141 is inputted to the data processing execution unit 150.

The image input unit 112 captures an image of a speaking user and surroundings thereof, and inputs the image to the image analysis unit 162.

The image analysis unit 142 analyzes facial expression of the speaking user, a user's behavior, surrounding information of the speaking user, and the like, and inputs an analysis result to the data processing execution unit 150.

The sensor 113 includes various sensors such as, for example, a position sensor such as GPS, a temperature sensor, and the like. Acquired information of the sensor is inputted to a sensor information analysis unit 143.

The sensor information analysis unit 143 acquires data such as, for example, a current position and temperature on the basis of sensor acquisition information, and inputs this analysis result to the data processing execution unit 150.

The data processing execution unit 150 includes a user identification unit 151, a context analysis unit 152, and a processing execution unit 153.

The user identification unit 151 identifies a user included in a camera captured image on the basis of information inputted from the input data analysis unit 140, for example, input information and the like from the image analysis unit 142. Note that information to be applied for user identification, such as user face information, is stored in the user information database (DB) 171 of the storage unit 170.

The context analysis unit 152 analyzes a current situation (a context) on the basis of information inputted from the input data analysis unit 140, for example, input information and the like from the image analysis unit 142.

The context is information indicating a user and a surrounding situation grasped on the basis of input information of the microphone, the camera, and various sensors included in the input unit 110. For example, it is data indicating a user's situation such as "the user is eating" and "the user is making a phone call".

The context analyzed by the context analysis unit 152 is recorded in the context log DB 174 of the storage unit 170. In the context log DB 174, context information detected at each time is recorded in association with detection time.

The context analysis unit 152 also analyzes a causal relationship of multiple context data.

Specifically, for example, in a case where there is a causal relationship between multiple different situations (contexts) observed as time passes, one of two situations (contexts) is to be a cause context and another one is to be a result context.

The result context is a context (a situation) that is likely to occur after an occurrence of the cause context. Such two contexts are determined to be contexts having a causal relationship.

A specific example will be described.

Context A=a user is trying to order pizza over the phone

Context B=a user is eating a visa.

In a case where these two Contexts A and B are observed in time series, it can be inferred that Context B is the result context with Context A as the cause context.

It is determined that such two Contexts A and B are contexts having a causal relationship.

Causal relationship information of a context acquired as a context analysis result of the context analysis unit 152 is stored in a causal relationship information DB 175 of the storage unit 170.

Context analysis processing by the context analysis unit 152 and a process based on an analysis result will be described in detail later.

The processing execution unit 153 performs: a process for a request from the user, such as, for example, generating a response to a question from the user; application execution processing; and also application existence notification processing based on a context analysis result of the context analysis unit 152.

Note that the context analysis unit 152 also analyzes a reaction of the user after the application existence notification processing executed by the processing execution unit 153 to the user. That is, user feedback analysis processing for app announcement is also executed.

The application existence notification processing based on a context analysis result of the context analysis unit 152 executed by the processing execution unit 153, and the user feedback analysis processing for the app existence notification will be described in detail later.

An application executed by the processing execution unit 153 can be acquired from, for example, the application DB 172 of the storage unit 170 or an external server connected via the communication unit 180.

The processing execution unit 153 further acquires application usage log information related to an application used by the user, and stores in the app usage log DB 173 of the storage unit 170.

The output information generation unit 160 includes the output voice generation unit 161 and the display information generation unit 162.

The output voice generation unit 161 generates system utterance voice based on an application executed by the processing execution unit 153 of the data processing execution unit 150.

Response voice information generated by the output voice generation unit 161 is outputted via the voice output unit 121 such as a speaker.

The display information generation unit 162 displays text information of a system utterance and other presentation information to the user.

For example, in a case where the user makes a user utterance to ask showing of the world map, the world map is displayed.

The world map can be acquired from, for example, a service providing server.

Furthermore, the processing execution unit 153 also executes the application existence notification processing based on a context analysis result of the context analysis unit 152. This notification is executed by using voice or an image generated by the system by using the output information generation unit 160 and the output unit 120.

Note that FIG. 3 has been described as a configuration example of the agent device 10. However, as described above, the data processing unit 130, the storage unit 170, and the like other than the input unit 110 and the output unit 120 in the configuration shown in FIG. 3 may be configured in an external server instead of being configured in the agent device 10.

Figure 4:
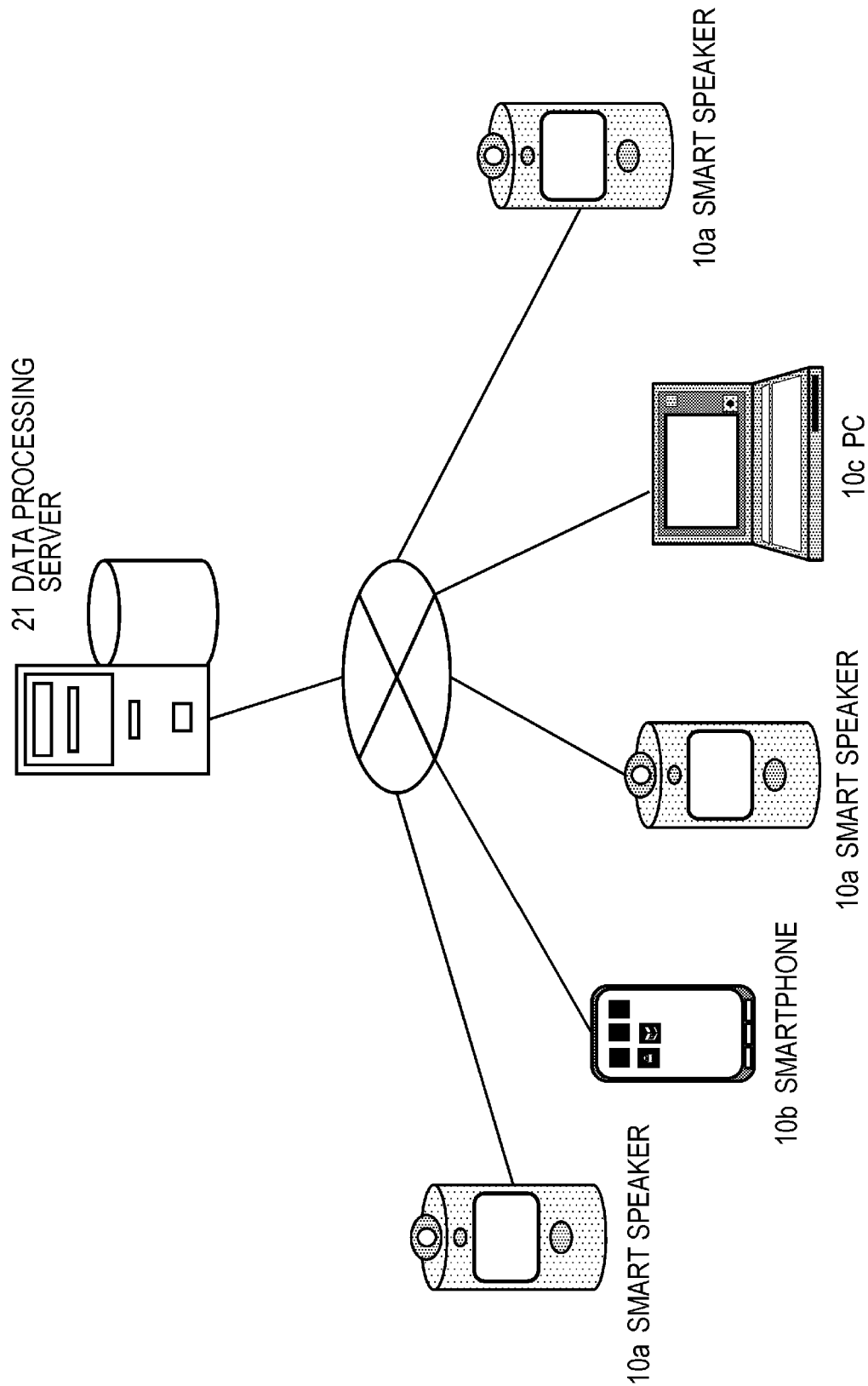
FIG. 4 is a diagram for explaining an example of a network connection configuration.

For example, as shown in FIG. 4, a large number of agent devices 10, which are user terminals, and a data processing server 21 are connected via a network. Each agent device 10 is configured by a terminal such as a smartphone and a PC owned by each individual, or a user terminal such as a smart speaker in each house. Each agent device 10 transmits, to the data processing server 21, information of dialogue with each user executed by the agent device 10, image information, voice information, sensor detection information, and the like acquired via the input unit. The data processing server 21 receives a variety of types of information from each agent device 10, and performs analysis. Such a configuration can be adopted.

Note that, in the network connection configuration as shown in FIG. 4, a variety of settings can be made for division of processes executed by each of the agent device 10 and the data processing server 21.

Figure 5:
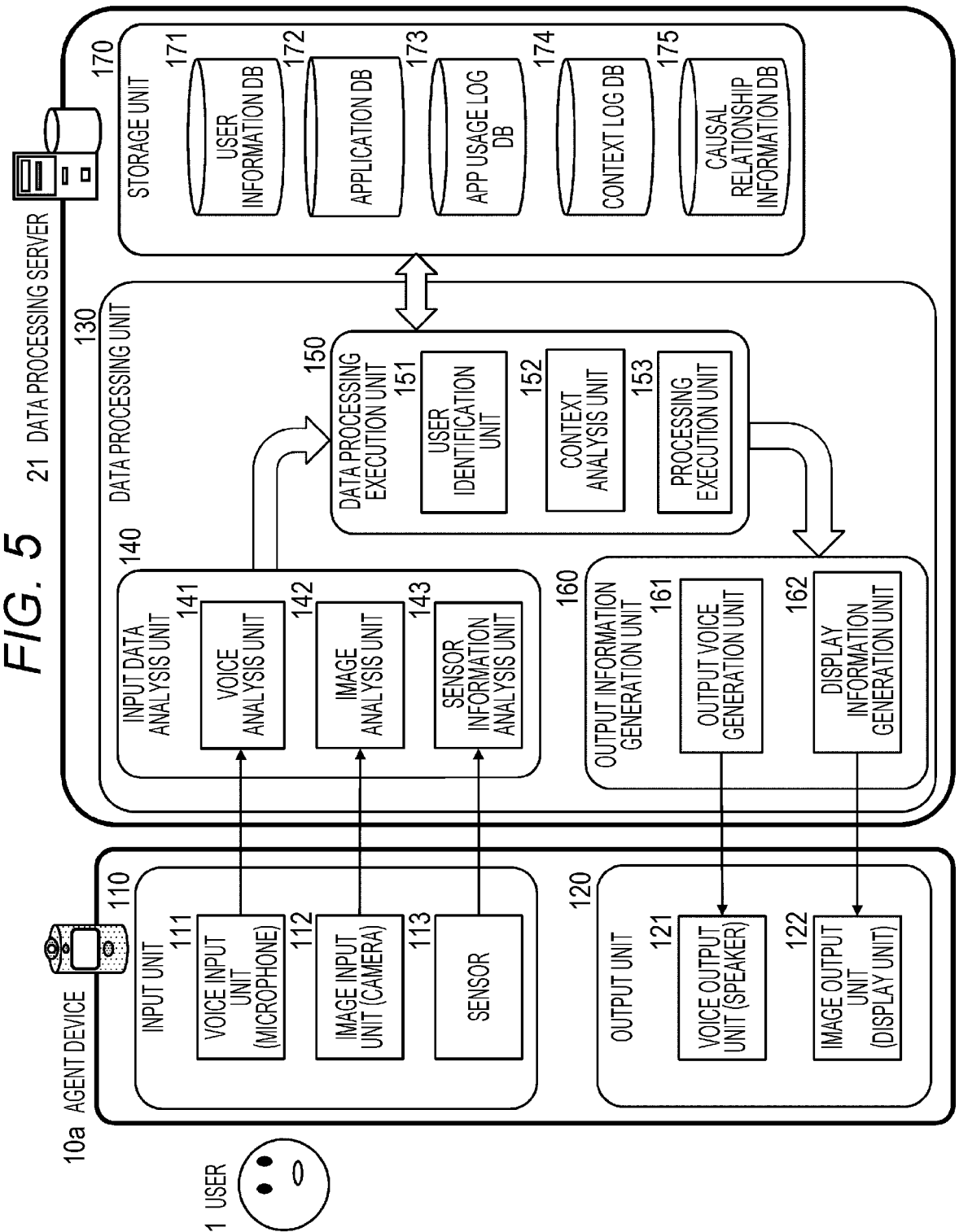
FIG. 5 is a diagram for explaining a configuration and a processing example of an agent device and a data processing server.

For example, as shown in FIG. 5, a configuration can be adopted in which the agent device 10 has the input unit 110 and the output unit 120, and the data processing server 21 has the data processing unit 130 and the storage unit 170.

Figure 6:
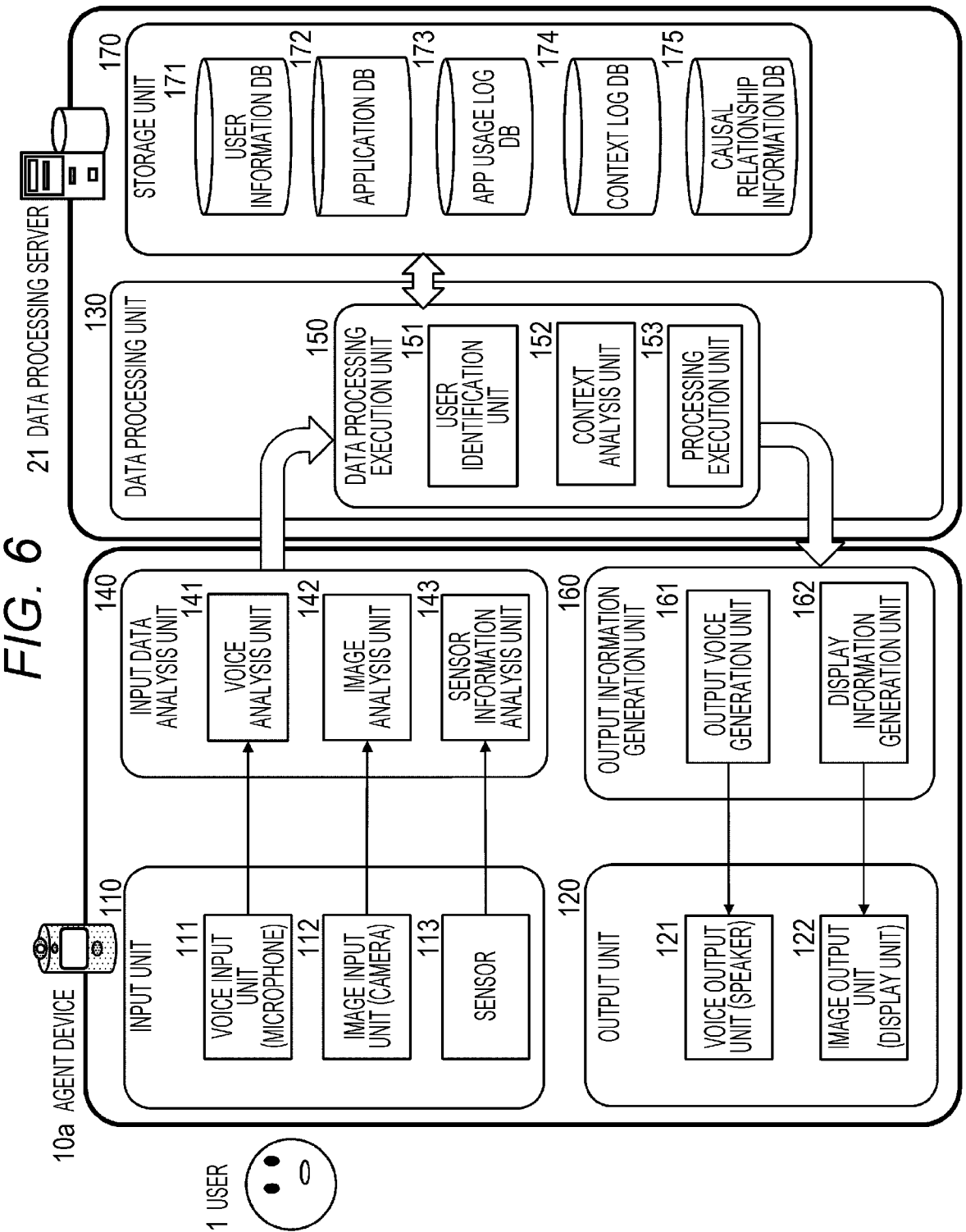
FIG. 6 is a diagram for explaining a configuration and a processing example of the agent device and the data processing server.

Alternatively, as shown in FIG. 6, a configuration can also be adopted in which the agent device 10 has the input unit 110 and the input data analysis unit 140, and further has the output information generation unit 160 and the output unit 120, while the data processing server 21 has the data processing execution unit 160 and the storage unit 170.

In a case where the network connection configuration as shown in FIG. 4 is adopted, the data processing server 21 can input and analyze information of dialogue and the like with users in a large number of agent devices 10 connected to the network, and can perform more accurate analysis.

2. About Stored Data Configuration of Database in Storage Unit

Next, a stored data configuration of each database in the storage unit 170 in the configuration shown in FIGS. 3, 5, and 6 will be described.

As described above, the storage unit 170 has the user information database (DB) 171, the application DB 172, the app usage log DB 173, the context log DB 174, and the causal information DB 175.

(Data Configuration Example of User Information DB)

Figure 7:
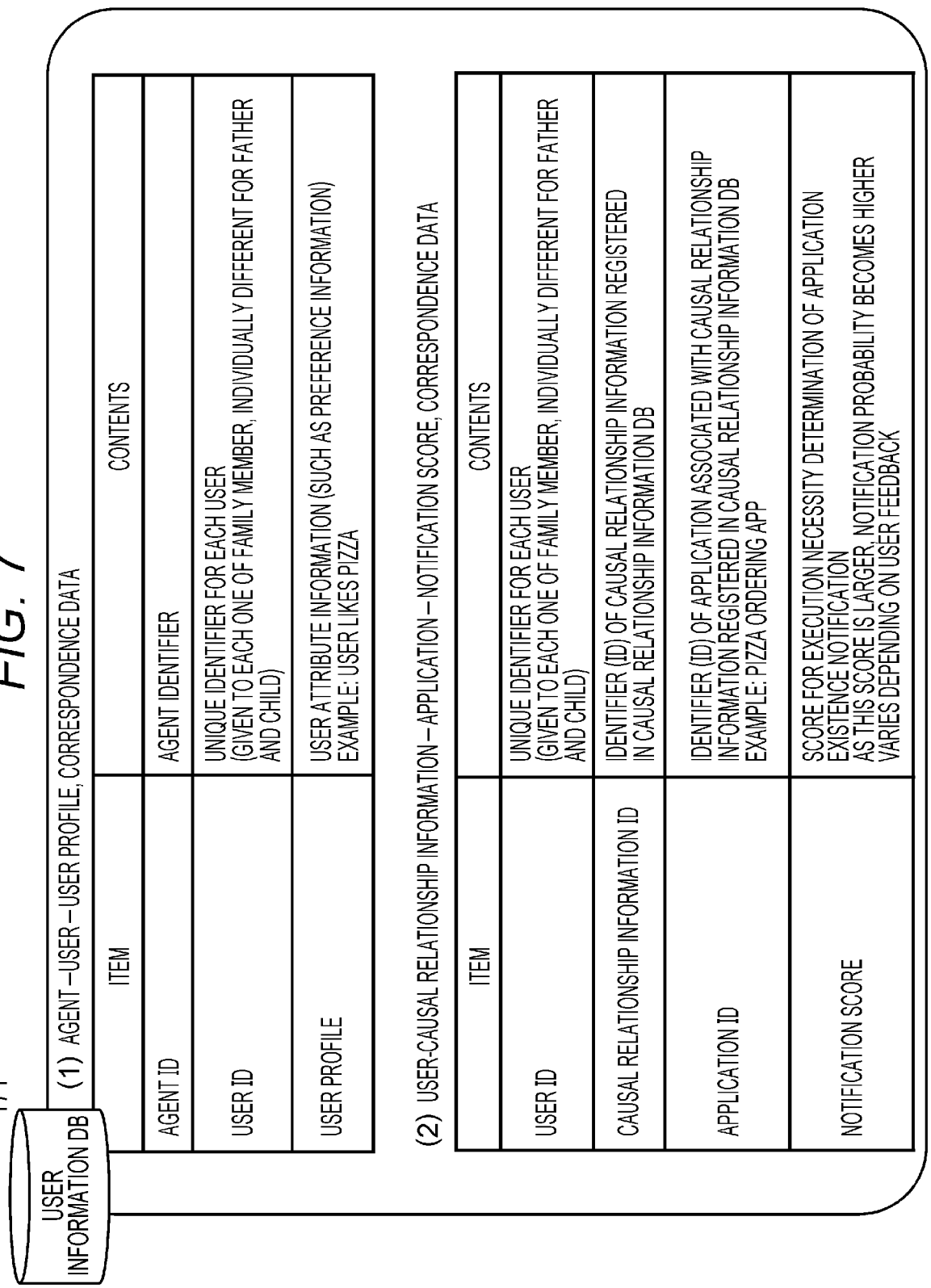
FIG. 7 is a view for explaining a specific example of stored data in a user information DB.

FIG. 7 is a view for explaining a configuration example of stored data of the user information DB 171.

As shown in FIG. 7, the following two types of correspondence data are recorded in the user information DB 171.

(1) Agent-User-User profile correspondence data
(2) User-Causal relationship information-Application-Notification score correspondence data "(1) Agent-User-User profile correspondence data" records correspondence data of an identifier (ID) of an agent device, a user ID of a user who uses the agent device, and attribute information (a profile) of the user.

In a case where there is a plurality of users who uses one agent device, for example, in a case where there is a plurality of users such as family members, an individual user ID is recorded for each user.

In the user attribute information recorded in the user profile, for example, a user's gender, age, preference information, a user's face image, voice information, and the like are recorded. The user's face image, the voice information, and the like are used for user identification.

"(2) User-Causal relationship information-Application-Notification score correspondence data" records correspondence data of a user ID, a causal relationship information identifier (ID) registered in the causal relationship information DB 175, an identifier (ID) of an application associated with causal relationship information registered in the causal relationship information DB, and a notification score that is used for determining whether or not to notify the user of existence of this application.

A configuration of the causal relationship information DB 175 will be described later.

The application is an application that can be used in the agent device 10, such as, for example, a pizza ordering app.

(Data Configuration Example of Application DB and App Usage Log DB)

FIG. 8 shows a configuration example of stored data of the application DB 172 and the app usage log DB 173.

As shown in FIG. 8, the application DB 172 records correspondence data of an app ID and an application. The app ID is an identifier of an application, and the application is an entity of the application, that is, an application program.

Furthermore, the app usage log DB 173 records correspondence data of an agent ID, time, and app execution information.

The agent ID is an identifier of an agent, and the time is time information when the application is executed (used) in the agent device. In the app execution information, an identifier of an application executed at registration time in the agent is recorded.

(Data Configuration Example of Context Log DB and Causal Relationship Information DB)

FIG. 9 shows a configuration example of stored data of the context log DB 174 and the causal relationship information DB 175.

As shown in FIG. 9, the context log DB 174 records correspondence data of an agent ID, time, and context information.

The agent ID is an identifier of an agent, and the time is acquisition time of a context (a situation) acquired by the agent device. The context information is context information acquired at that time, for example, context information indicating a user situation such as "the user is eating pizza".

Furthermore, as shown in FIG. 9, the causal relationship information DB 175 records correspondence data of a causal relationship information ID, an application ID, cause context information, and result context information.

The causal relationship information ID is an identifier (ID) for each piece of registration information (entry) registered in the causal relationship information DB 175, and is an identifier of an entry having a cause context and a result context determined to have a causal relationship.

The application ID is an identifier of an app associated with the causal relationship information ID, and is an identifier of an available application related to a cause context and a result context determined to have a causal relationship.

In the cause context information and the result context information, specific information of a cause context and a result context for which a causal relationship has been recognized is recorded.

For example,
cause context information=looking at a pizzeria leaflet, and
result context information=eating pizza,
these two pieces of context information for which a causal relationship is confirmed is recorded.

3. About Details of Context Causal Relationship Determination Processing Based on Context Analysis Next, details of causal relationship determination processing on a context based on context analysis executed by the agent device 10 of the present disclosure will be described.

As described above with reference to FIG. 3, the context analysis unit 152 of the data processing unit 130 analyzes a current situation (a context) on the basis of, for example, input information and the like from the image analysis unit 142.

The context is information indicating a user and a surrounding situation grasped on the basis of input information of the microphone, the camera, and various sensors included in the input unit 110. For example, it is data indicating a user's situation such as "the user is eating" and "the user is making a phone call".

The context analyzed by the context analysis unit 152 is recorded in the context log DB 174 of the storage unit 170.

The context analysis unit 152 also analyzes a causal relationship of multiple context data. Specifically, for example, in a case where there is a causal relationship between two different situations (contexts), one of the two situations (contexts) is to be a cause context and another one is to be a result context.

The result context is a context that has occurred after a situation indicated by the cause context, and these two contexts are determined to be contexts having a causal relationship.

A specific example will be described.
Context A=a user is trying to order pizza over the phone
Context B=a user is eating a visa.

In a case where these two Contexts A and B are observed in time series, it can be inferred that Context B is the result context that has occurred with Context A as the cause context.

It is determined that there is a causal relationship between such two Contexts A and B.

Causal relationship information of a context acquired as the context analysis result of the context analysis unit 152 is stored in the causal relationship information DB 175 of the storage unit 170.

A specific example of the context analysis processing executed by the context analysis unit 152 and information registered in the causal relationship information DB 175 on the basis of an analysis result will be described.

Figure 12:
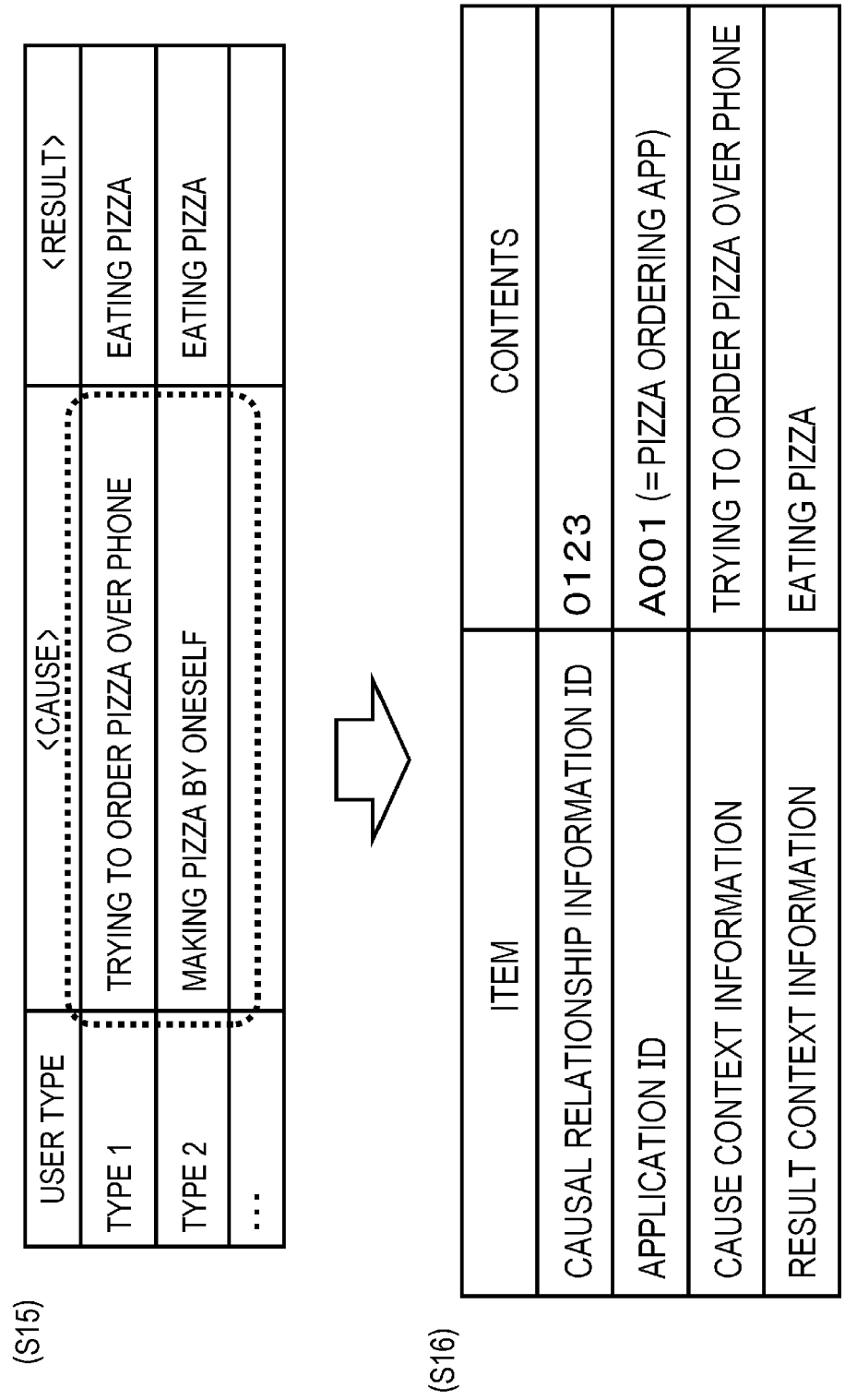
FIG. 12 is a view for explaining an example of the context analysis processing executed as a process of the present disclosure.

FIGS. 10 to 12 are views showing, in accordance with a processing sequence, context information acquired in the context analysis processing executed by the context analysis unit 152, and information registered in the causal relationship information DB 175 on the basis of an analysis result.

The process proceeds in the order of steps S11 to S16 shown in FIGS. 10 to 12.

Data shown in steps S11 to S15 are examples of context information sequentially acquired by the context analysis unit 152 in the context analysis processing executed by the context analysis unit 152.

The data shown in step S16 is an example of information to be registered in the causal relationship information DB 175 as a result of the analysis processing in steps S11 to S15.

Hereinafter, the process executed by the context analysis unit 152 will be described in the order of steps S11 to S16.

Note that the process described with reference to steps S11 to S15 is an example of a process executed by the network-connected data processing server 21 described above with reference to FIG. 4 by using input information from a large number of agent devices 10.

The data processing server 21 acquires input information (camera captured images, microphone acquired voice, sensor detection information) from the input units 110 of a large number of agent devices 10, and performs analysis.

Note that, as described with reference to FIG. 3, the agent device 10 can also execute all the processes.

In a case where the data processing server 21 performs the process, the data processing server 21 analyzes input information from a plurality of agent devices. Whereas, in a case where the agent device 10 performs the process, input information from that one agent device is to be analyzed.

In the following, a processing example of a process executed by the network-connected data processing server 21 by using input information from a large number of agent devices 10 will be described.

Hereinafter, the process executed by the context analysis unit 152 of the data processing server 21 will be described in the order of steps S11 to S16.

(Step S11)

First, in step S11, the context analysis unit 152 of the data processing server 21 generates correspondence data for each user between an operation log of a specific application and context information after an operation registered as the log, on the basis of input information from the network-connected agent device.

Note that, for the application operation log, information registered in the app usage log DB 173 is acquired and used.

The example shown in (S11) of FIG. 10 is an example of correspondence data for each user, between an operation log of a "pizza ordering app" that can be used in the agent device and context information="eating pizza" after executing this operation log.

The context analysis unit 152 acquires a common application operation log and context information from Persons A, D, and E, which are users, that is, app log=an operation log of the "pizza ordering app", and
Context 1="eating pizza",
these are acquired.

(Step S12)

Next, in step S12, the context analysis unit 152 searches the context log DB 174 for Context 1="eating pizza", which is same as this Context 1, Context 1="eating pizza"
acquired in step S11, and further acquires another Context 2 from the context log DB 174 at time before the context acquisition time of the searched Context 1.

The context analysis unit 152 generates correspondence data shown in FIG. 10 (S12) while associating Context 1="eating pizza" acquired from the context log DB 174 as a result context, with another Context 2 at the time before the context acquisition time of Context 1 as a "cause candidate context". That is, cause candidate context (Context 2), and
result context (Context 1)="eating pizza",
a large number of set data including these two contexts are generated.

The cause candidate context (Context 2) includes a variety of different contexts.

Context information of Person A, Person D, and Person E is the same as in step S11, and is a combination of these contexts, cause candidate context (Context 2)="ordering pizza through the agent", and
result context (Context 1)="eating pizza".

However, other cause candidate contexts (Context 2) of Person B, Person C, and the like are different contexts.

The context information of Person B is a combination of these contexts, cause candidate context (Context 2)="trying to order pizza over the phone", and
result context (Context 1)="eating pizza".

Furthermore, the context information of Person C is a combination of these contexts, cause candidate context (Context 2)="making pizza by oneself", and
result context (Context 1)="eating pizza".

(Step S13)

Next, in step S13, the context analysis unit 152 aggregates the same cause candidate contexts for the correspondence data of these cause candidate context and result context acquired in step S12, cause candidate context (Context 2), and
result context (Context 1)="eating pizza",
classifies by each cause candidate context, and calculates the number of users for each cause candidate context.

An aggregated result is data in FIG. 11 (S13).

The data shown in FIG. 11 (S13) is data in which users with the same cause candidate context are set as the same user type, and the cause candidate context and the result context (=eating pizza) of each user type is associated with the number of users of each type.

Type 1 is as follows.
Cause candidate context="trying to order pizza over the phone"
Result context="eating pizza"
Number of users=200
Type 2 is as follows.
Cause candidate context="making pizza by oneself"
Result context="eating pizza"
Number of users=100
Type 3 is as follows.
Cause candidate context="aunt has brought a gift"
Result context="eating pizza"
Number of users=10

FIG. 11 (S13) indicates these three correspondence data.

Thus, in step S13, the same cause candidate context is aggregated for the correspondence data of these cause candidate context and result context acquired in step S12, cause candidate context (Context 2), and
result context (Context 1)="eating pizza",
and classified by each cause candidate context (=type), and the number of users for each cause candidate context is calculated.

(Step S14)

Next, in step S14, for data for each type aggregated in step S13, that is, data indicating the number of users for each cause candidate context, the context analysis unit 152 calculates a probability that this result context, result context="eating pizza"
occurs after each type of cause candidate context.

The context analysis unit 152 executes analysis of stored data of the context log DB 174, and calculates a probability that this result context, result context="eating pizza"
occurs after each type of cause candidate context.

A result of this calculation processing is data shown in FIG. 11 (S14).

Type 1 is as follows.
Cause candidate context="trying to order pizza over the phone"
Result context="eating pizza"
Probability that the result context described above occurs after the cause candidate context described above=95%
Type 2 is as follows.
Cause candidate context="making pizza by oneself"
Result context="eating pizza"
Probability that the result context described above occurs after the cause candidate context described above=98%
Type 3 is as follows.
Cause candidate context="aunt has brought a gift"
Result context="eating pizza"
Probability that the result context described above occurs after the cause candidate context described above=10%

FIG. 11 (S14) indicates these three correspondence data.

As described above, in step S14, for data for each type aggregated in step S13, that is, data indicating the number of users for each cause candidate context, a probability that this result context, result context="eating pizza"
occurs after each type of cause candidate context is calculated.

(Step S15)

Next, in step S15, the context analysis unit 152 extracts data (a type) whose value of a probability for each type calculated in step S14, that is, a probability of an occurrence of this result context, result context="eating pizza"
after the cause candidate context for each type is equal to or higher than a predetermined threshold value.

An extraction result is data shown in FIG. 12 (S15).

This example shows an example in which a threshold value is set to 90%, as an example, and data having a probability equal to or higher than the threshold value is selected.

Selection data having a probability equal to or higher than the threshold value is the following each type of data.

Type 1
  Cause candidate context="trying to order pizza over the phone"
  Result context="eating pizza"
Type 2
  Cause candidate context="making pizza by oneself"
  Result context="eating pizza"
  Data of these Types 1 and 2 are selected as
  correspondence data of the cause context-result context having a probability of equal to or larger than the threshold value.
(Step S16)

Finally, in step S16, the context analysis unit 152 registers, as contexts having a causal relationship, a pair of the cause context and the result context, which are included in the type data (Type 1, Type 2) having a probability higher than the threshold and selected in step S15, into the causal relationship information DB 175.

An example of this registration data is data shown in FIG. 12 (S16).

FIG. 12 shows an example of Type 1 data, that is, registration information for the following Type 1 data,
  cause candidate context="trying to order pizza over the phone", and
  result context="eating pizza".

The following individual data are recorded in association with each other in the causal relationship information DB 175.
  Causal relationship information ID=0123
  Application ID=A001 (=pizza ordering app)
  Cause context information="trying to order pizza over the phone"
  Result context information="eating pizza"
  Application ID=A001 (=pizza ordering app) is
  app usage information for result context="eating pizza", that is, an application operated with the app operation log acquired in step S11.

That is, there is shown an application that can be used to cause the same result context="eating pizza", instead of
  cause context information="trying to order pizza over the phone"
  registered in the causal relationship information DB 175.

For example, the processing execution unit 153 of the data processing unit 130 of the agent device 10 or the data processing server 21 refers to registration information of this causal relationship information DB 175 at a time when a context similar to cause context information="trying to order pizza over the phone" is newly acquired.

The processing execution unit 153 further acquires a registration entry of cause context information="trying to order pizza over the phone" from registration data of the causal relationship information DB 175, and identifies an application recorded in association with the acquired entry. The processing execution unit 153 notifies the user of existence of the identified "pizza ordering app".

By performing such app existence notification, the user can know that pizza can be ordered using the agent device. As a result, the user can stop ordering pizza over the phone and perform a process using the pizza ordering app of the agent device. As a result, the app usage rate can be increased.

Note that a notification processing sequence of the app will be described in detail later.

4. About Context Analysis Processing Example in Case where Causal Relationship is Linked to Three or More Contexts The process described with reference to steps S11 to S16 of FIGS. 10 to 12 has been a processing example of analyzing a causal relationship between one cause context and one result context and recording a set (a pair) of contexts having a causal relationship into the causal relationship information DB 175.

However, a causal relationship of contexts is not limited to a relationship of one cause context and one result context, and there is a case where a causal relationship exists between three or more contexts.

In the following, a context analysis processing example in a case where a causal relationship exists between three or more contexts will be described.

FIGS. 13 to 16 are views showing, in accordance with a processing sequence, context information to be acquired in the context analysis processing executed by the context analysis unit 152, and information registered in the causal relationship information DB 175 and the user information DB 171 on the basis of an analysis result.

Note that the data shown in step S15 shown in FIG. 13 is the same data as that in step S15 in FIG. 12, and is the data obtained by executing steps S11 to S15 in FIGS. 10 to 12.

In this processing example, processes of step S21 and subsequent steps are executed after this step S15.

The processes of step S15 and subsequent steps shown in FIG. 13 will be sequentially described.
(Step S15)

In step S15, the context analysis unit 152 extracts data (a type) whose value of a probability for each type calculated in step S14 described above with reference to FIG. 11, that is, a probability of an occurrence of this result context,
  result context="eating pizza"
    after the cause candidate context for each type is equal to or higher than a predetermined threshold value.

An extraction result is data shown in FIG. 13 (S15).

This example shows an example in which a threshold value is set to 90%, as an example, and data having a probability equal to or higher than the threshold value is selected.

Data selected as data having a probability equal to or higher than the threshold value is the following each type of data.

Type 1
  Cause candidate context="trying to order pizza over the phone"
  Result context="eating pizza"
Type 2
  Cause candidate context="making pizza by oneself"
  Result context="eating pizza"
  Data of these Types 1 and 2 are selected as
  correspondence data of the cause context-result context having a probability of equal to or larger than the threshold value.
(Step S21)

Next, in step S21, in a case where a cause context included in the type data (Type 1, Type 2) having probability higher than the threshold value and selected in step S15 is set as a result context, the context analysis unit 152 searches the context log DB 174 for and extracts a cause candidate context (Cause candidate context 2) that has occurred prior to the context.

An extraction result is data shown in FIG. 13 (S21).

Cause context of Type 1=trying to order pizza over the phone

As the cause candidate context (Cause candidate context 2) that has occurred prior to this cause context, context information of users=Person B and Person H shown in FIG. 13 (S21) is obtained.

Both Users B and H have the following context pair.

Cause candidate context 2=looking at a pizzeria leaflet

Result context=trying to order pizza over the phone

Furthermore, the cause context of Type 2=making pizza by oneself, as the cause candidate context (Cause candidate context 2) that has occurred prior to this cause context, context information of users=Person C and Person G shown in FIG. 13 (S21) is obtained.

User C has the following context pair.

Cause candidate context 2=opening a refrigerator

Result context=making pizza by oneself

User G has the following context pair.

Cause candidate context 2=looking at a pizzeria leaflet

Result context=making pizza by oneself (Step S22)

Next, in step S22, the context analysis unit 152 classifies the data extracted in step S21 by type, and calculates a probability of an occurrence of a result context of that type after each type of Cause candidate context 2.

This probability calculation is calculation using data stored in the context log DB 174.

A result of this calculation processing is data shown in FIG. 14 (S22).

Type 1 is as follows.

Cause candidate context 2="looking at a pizzeria leaflet"

Result context="trying to order pizza over the phone"

Probability that the result context described above occurs after the cause candidate context described above=82%

Type 2 is as follows.

Cause candidate context 2="looking at a pizzeria leaflet"

Result context="making pizza by oneself"

Probability that the result context described above occurs after the cause candidate context described above=15%

Type 3 is as follows.

Cause candidate context 2="opening a refrigerator"

Result context="trying to order pizza over the phone"

Probability that the result context described above occurs after the cause candidate context described above=0.3%

Type 4 is as follows.

Cause candidate context 2="opening a refrigerator"

Result context="making pizza by oneself"

Probability that the result context described above occurs after the cause candidate context described above=2%

In this way, in step S22, the data extracted in step S21 is classified by type, and a probability of an occurrence of a result context of that type after each type of Cause candidate context 2 is calculated.

(Step S23)

Next, in step S23, the context analysis unit 152 extracts data (a type) in which a value of the probability by each type calculated in step S22, that is, a value of the probability that the result context occurs after Cause candidate context 2 of each type, is equal to or larger than a predetermined threshold.

An extraction result is data shown in FIG. 14 (S23).

This example shows an example in which a threshold value is set to 80%, as an example, and data having a probability equal to or higher than the threshold value is selected.

Data selected as data having a probability equal to or higher than the threshold value is the following each type of data.

Type 1

Cause candidate context 2="looking at a pizzeria leaflet"

Result context="trying to order pizza over the phone"

(Step S24)

Next, in step S24, the context analysis unit 152 generates these three context correspondence data, Cause content text 2 selected in step S23, Result context 2 (=Cause candidate context 1) of this Cause context 2, and Result context 1 of Cause candidate context 1 (=Result context 2).

Data shown in FIG. 15 (S24) is this data.

The three context correspondence data for each user are generated.

These three contexts are determined to be contexts that have a causal relationship and that occur in chronological order.

(Step S25)

Finally, in step S25, the context analysis unit 152 registers a pair of these two contexts in the three context correspondence data for each user generated in step S24, Cause content text 2, and Result context 1, into the causal relationship information DB 175 as contexts having a causal relationship.

An example of this registration data is data shown in FIG. 15 (S25).

FIG. 15 shows an example of data of User B shown in step S24, that is, an example of registration information for this data, Cause candidate context 2="looking at a pizzeria leaflet, and Result context 1="eating pizza".

The following individual data are recorded in association with each other in the causal relationship information DB 175.

Causal relationship information ID=3210

Application ID=A001 (=pizza ordering app)

Cause context information="looking at a pizzeria leaflet"

Result context information="eating pizza"

Application ID=A001 (=pizza ordering app) is app usage information for result context="eating pizza", that is, an application operated with the app operation log acquired in step S11.

That is, there is shown an application that can be used to cause the same result context="eating pizza", instead of Cause context information="looking at a pizzeria leaflet" registered in the causal relationship information DB 175.

For example, the processing execution unit 153 of the data processing unit 130 of the agent device 10 or the data processing server 21 refers to registration information of this causal relationship information DB 175 at a time when a context similar to cause context information="looking at a pizzeria leaflet" is newly acquired.

The processing execution unit 153 further acquires a registration entry of cause context information="looking at a pizzeria leaflet" from registration data of the causal relationship information DB 175, and identifies an application recorded in association with the acquired entry. The processing execution unit 153 notifies the user of existence of the identified "pizza ordering app".

By performing such app existence notification, the user knows that pizza can be ordered using the agent device. As a result, it is possible to cause the user to order pizza using the pizza ordering app on the agent device after looking at a pizzeria leaflet.

(Step S26)

Step S26 is a process to be executed in a case where a "notification score" for each user is registered into the user information DB 171 as an index value for determining whether or not to execute the app existence notification processing to the user.

FIG. 16 shows an example of data recorded in the user information DB 171 in the process of step S16.

As described above with reference to FIG. 7, the following two types of correspondence data are recorded in the user information DB 171.

(1) Agent-User-User profile correspondence data
(2) User-Causal relationship information-Application-Notification score correspondence data "(1) Agent-User-User profile compatible data" records correspondence data of an identifier (ID) of an agent device, a user ID of a user who uses the agent device, and attribute information of the user.

"(2) User-Causal relationship information-Application-Notification score correspondence data" records correspondence data of a user ID, a causal relationship information identifier (ID) registered in the causal relationship information DB, an identifier (ID) of an application associated with causal relationship information registered in the causal relationship information DB, and a notification score that is used for determining whether or not to notify the user of this application.

FIG. 16 shows a recording example of these two data.

In "(1) Agent-User-User profile correspondence data",
agent device identifier (ID)=E001,
user ID of a user who uses an agent device=U1234, and attribute information of this user=user likes pizza, such correspondence data is recorded.

In "(2) User-Causal relationship information-Application-Notification score correspondence data"
user ID=U1234,
causal relationship information identifier (ID) registered in the causal relationship information DB=3210,
identifier (ID) of an application associated with causal relationship information registered in the causal relationship information DB=A001 (pizza ordering app), and
notification score that is used for determining whether or not to notify the user of this application=85,
these correspondence data are recorded.

Note that the notification score is set in a range of 0 to 100, for example, and the score=85 described above indicates setting in which the app existence notification is executed with a probability of 85/100, that is, a probability of 85%.

When executing the process of notifying the user of the existence of the "pizza ordering app", the processing execution unit 153 determines whether or not to notify, by referring to the notification score of each user. In the example described above, notification is given with a probability of 85%.

Note that, for the notification score recorded in the user information DB 171, a predetermined initial value is recorded, for example, an initial value such as initial score=85. Moreover, score value update processing is sequentially executed in accordance with user feedback information and the like acquired in the subsequent processes.

This processing sequence will be described later.

5. About Sequence of Process Executed by Data Processing Unit

Next, a processing sequence executed by the data processing unit 130 of the agent device 10 or the data processing server 21 will be described with reference to flowcharts shown in FIGS. 17 to 19.

The following three processes will be described in sequence.

Figure 17:
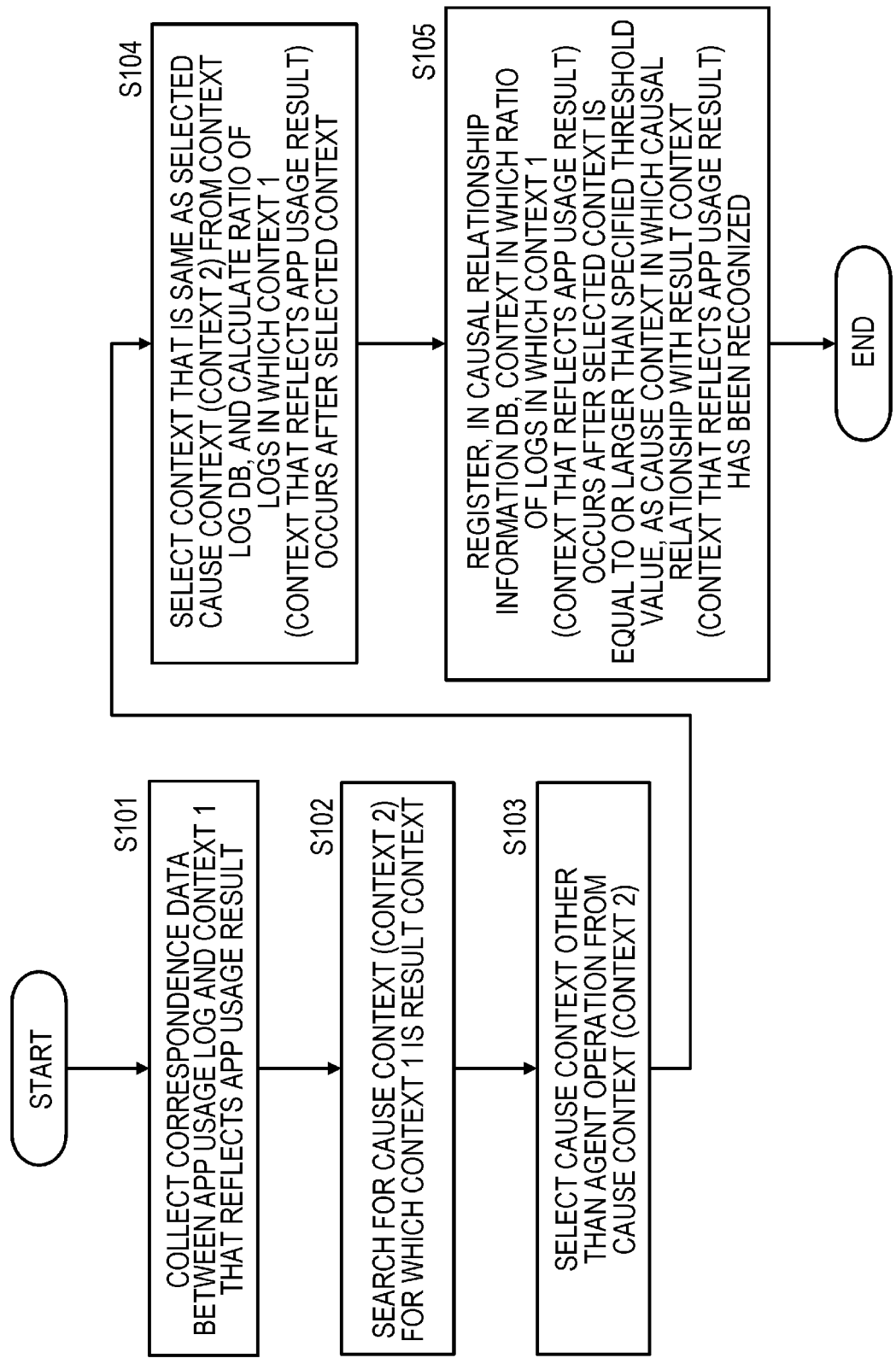
FIG. 17 is a view showing a flowchart for explaining a sequence of a process executed by the information processing apparatus.

(Process 1) Process of determining presence or absence of causal relationship between multiple contexts on basis of context analysis, and registering context for which causal relationship has been confirmed, into causal relationship information DB (FIG. 17)

Figure 18:
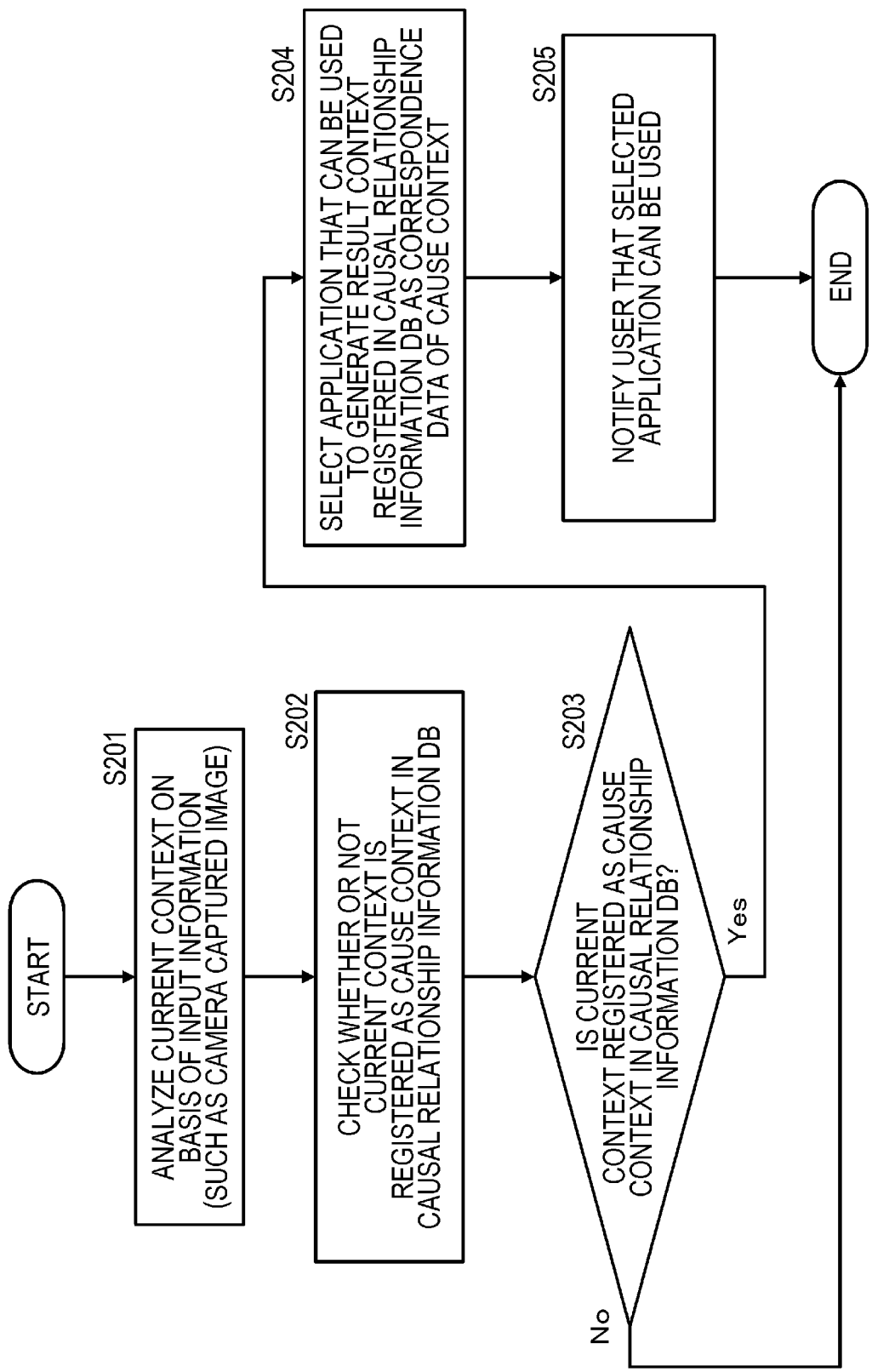
FIG. 18 is a view showing a flowchart for explaining a sequence of a process executed by the information processing apparatus.

(Process 2) Process of executing app existence notification to user on basis of context analysis and registration data reference of causal relationship information DB (FIG. 18)

Figure 19:
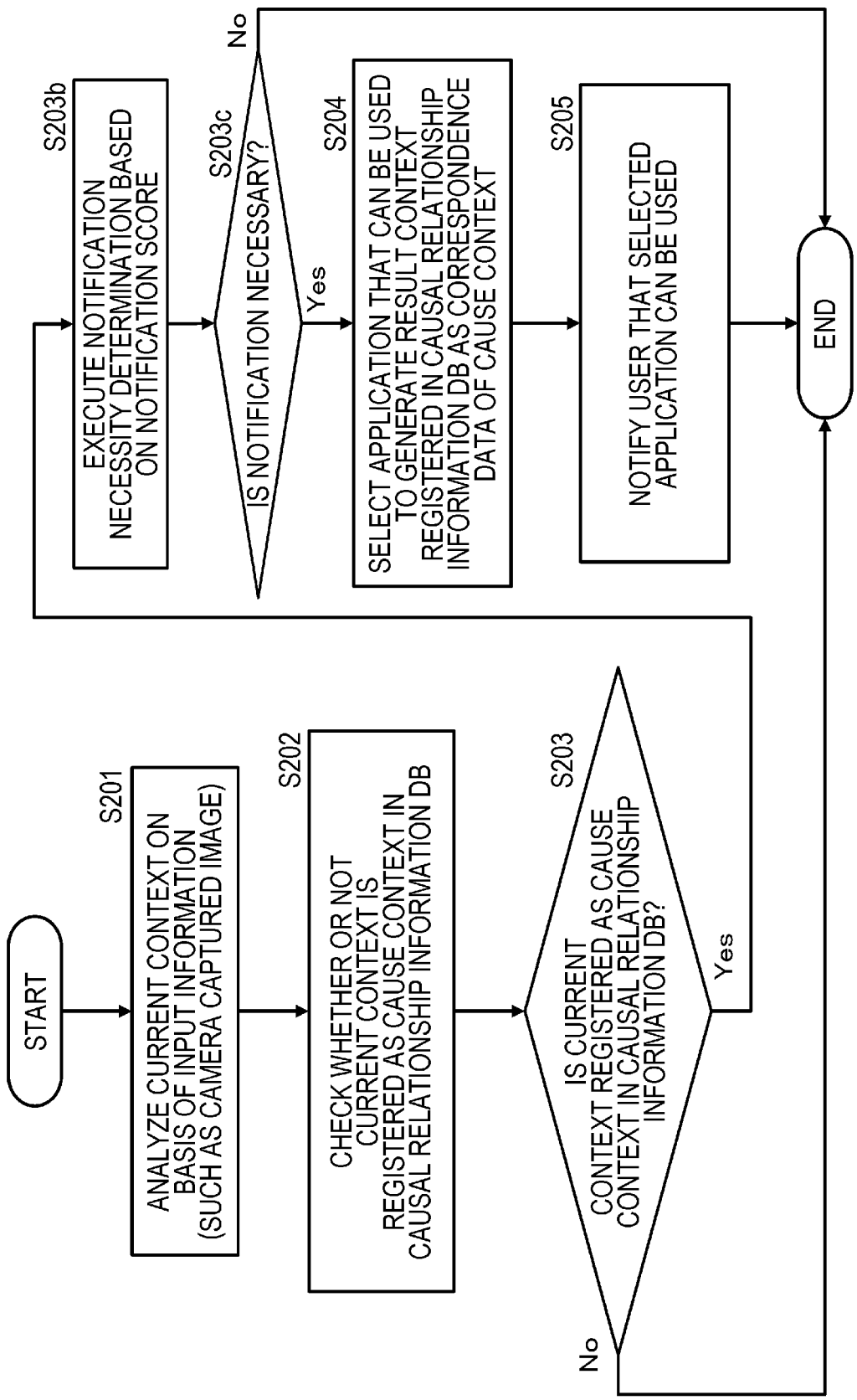
FIG. 19 is a view showing a flowchart for explaining a sequence of a process executed by the information processing apparatus.

(Process 3) Process of determining whether or not to execute app existence notification to user on basis of notification score (FIG. 19)

Note that the processing according to the flowchart shown in FIG. 17 and subsequent figures can be executed in accordance with a program stored in a storage unit of the agent device 10 or the data processing server 21, which are the information processing apparatus of the present disclosure. For example, it is possible to execute a program in a data processing unit equipped with a processor such as a CPU having a program execution function.

Hereinafter, each process of a flow shown in FIG. 17 and subsequent figures will be sequentially described.

[5-1. (Process 1) Process of Determining Presence or Absence of Causal Relationship Between Multiple Contexts on Basis of Context Analysis, and Registering Context for which Causal Relationship has been Confirmed, into Causal Relationship Information DB]

First, with reference to the flowchart shown in FIG. 17, a description is given to a processing sequence of the process of determining the presence or absence of a causal relationship between multiple contexts on the basis of context analysis, and registering a context for which the causal relationship has been confirmed, into the causal relationship information DB.

A process of each step in the flow shown in FIG. 17 will be described.

(Step S101)

First, in step S101, the context analysis unit 152 of the data processing unit 130 of the agent device 10 or the data processing server 21, which are the information processing apparatus of the present disclosure, collects correspondence data between a specific application usage log by the user of the agent device and context information (Context 1) indicating a user's situation after using this app.

This process corresponds to the process of step S11 described above with reference to FIG. 10.

The process of step S101 generates correspondence data between the application usage log for each user shown in FIG. 10 (S11) and the context information (Context 1) indicating a user's situation after using this app.
(Step S102)

Next, in step S102, the context analysis unit 152 searches the context log DB 174 for a cause context (Context 2) for which Context 1 in the correspondence data generated in step S101 is a result context.

This process corresponds to the process of step S12 described above with reference to FIG. 10.

As described above with reference to FIG. 10 (S12), the cause candidate context (Context 2) includes a variety of different contexts.
(Step S103)

Next, in step S103, the context analysis unit 152 selects a cause context other than an agent operation from the cause context (Context 2) acquired in step S102.

This process corresponds to the process of step S13 described above with reference to FIG. 11.
(Step S104)

Next, in step S104, the context analysis unit 152 selects a context that is same as the cause context (Context 2) selected in step S103 from the context log DB, and calculates a ratio of logs in which Context 1 (a context that reflects an app usage result) occurs after the selected context.

This process corresponds to the process of step S14 described above with reference to FIG. 11.
(Step S105)

Next, in step S105, the context analysis unit 152 registers, in the causal relationship information DB 175, a context for which a ratio of logs in which Context 1 (a context that reflects an app usage result) occurs after the selected context is equal to or larger than a specified threshold value, as a cause context in which a causal relationship with a result context (a context that reflects an app usage result) has been recognized.

This process corresponds to the process of steps S15 and S16 described above with reference to FIG. 12.

As a result of these processes, the following correspondence data is recorded in the causal relationship information DB 175.

(a) Causal relationship information ID
(b) Application ID
(c) Cause context information
(d) Result context information These correspond to stored data of the causal relationship information DB 175 described above with reference to FIG. 9.

The data processing unit 130 of the agent device 10 or the data processing server 21 determines whether or not a context obtained by analysis based on input information from the input unit 110 of the agent device 10 is coincident or similar to a cause context registered in the causal relationship information DB 175. Then, in a case of being coincident or similar, it is possible to perform existence notification to the user of an app that can be used to generate a result context.

Specifically, as described above with reference to FIG. 12, for example, the user is notified of the existence of the "pizza ordering app". By performing such app existence notification, the user knows that pizza can be ordered using the agent device. As a result, it becomes possible to cause the user to place an order using the pizza ordering app on the agent device. That is, the app usage rate can be increased.

The context analysis unit 152 executes the process of determining the presence or absence of a causal relationship between contexts in this way, and registering the context determined to have a causal relationship into the causal relationship information DB 175.

Note that the process of determining the presence or absence of a causal relationship executed by the context analysis unit 152 can be executed by, for example, any of the following processes.

(A) What kind of context can be a target of a causal relationship in each app is defined in advance, and the presence or absence of the causal relationship is determined using definition information.

(B) The presence or absence of the causal relationship is automatically determined without definition in advance of what kind of context can be a target of the causal relationship in each app.

However, in a case where the process (B) described above is performed, there is a possibility that a context unrelated to the app will be detected as a context having a causal relationship and registered in the DB. If such a context unrelated to the app is registered in the DB, noise in the DB registration data will increase. Therefore, it is desirable to adopt setting so as not to perform such useless data registration.

A specific example will be described. For example, when context analysis processing is performed, there is a possibility that a series of contexts having a causal relationship is observed: "looking at a pizzeria leaflet"→"trying to order pizza over the phone"→"eating pizza". On the basis of such a series of contexts having a causal relationship, there is a possibility that "watching television" is registered as the cause context for the result context of "eating pizza". In such a case, there is a possibility that the pizza ordering app is to be announced when the user is watching television.

It is necessary to remove general contexts that occur often. Therefore, it is preferable to apply a technique such as term frequency/inverse document frequency (TF/IDF) for natural language processing, to perform a process with Term=context and Document=1 hour, and remove the context that appears at many times by determining to be unimportant.

5-2. (Process 2) Process of Executing App Existence Notification to User on Basis of Context Analysis and Registration Data Reference of Causal Relationship Information DB Next, with reference to a flowchart shown in FIG. 18, a description is given to a sequence of a process of executing app existence notification to a user on the basis of context analysis and registration data reference of the causal relationship information DB.

A process of each step in a flow shown in FIG. 18 will be described.
(Step S201)

First, in step S201, the context analysis unit 152 of the data processing unit 130 of the agent device 10 or the data processing server 21, which are the information processing apparatus of the present disclosure, analyzes and acquires a current context on the basis of input information from the input unit 110 of the agent device 10.
(Step S202)

Next, in step S202, the context analysis unit 152 checks whether or not the current context analyzed in step S201 is registered as a cause context in the causal relationship information DB 175.

(Step S203)

In a case where it is determined that the current context is registered as the cause context in the causal relationship information DB 175, the process proceeds to step S204.

In a case where it is determined that the current context is not registered, the process ends. In this case, the app existence notification is not executed.

(Step S204)

In a case where it is confirmed in steps S202 and S203 that the current context is registered as the cause context in the causal relationship information DB 175, the process proceeds to step S204.

Steps S204 to S205 are processes executed by the processing execution unit 153.

When the processing execution unit 153 receives a notification from the context analysis unit 152 that the current context is registered as a cause context in the causal relationship information DB 175, the processing execution unit 153 specifies in step S204 an application that can be used to generate the result context registered in the causal relationship information DB 175 as correspondence data of the cause context.

This is an application specified by an application ID registered in the causal relationship information DB 175.

(Step S205)

Next, in step S205, the processing execution unit 153 executes the existence notification of an application, to the user. The user is a person who uses the agent device 10.

The application that is a target of the existence notification is an application that corresponds to the application ID registered in the causal relationship information DB 175.

In a case where the user generates a context that is almost similar to the cause context registered in the causal relationship information DB 175 by this series of processes, the user can know the existence of the app that can be used to generate a result context registered in the causal relationship information DB 175.

Specifically, as described above with reference to FIG. 12, for example, the user is notified of the existence of the "pizza ordering app". By performing such app existence notification, the user knows that pizza can be ordered using the agent device. As a result, it becomes possible to cause the user to place an order using the pizza ordering app on the agent device.

5-3. (Process 3) Process of Determining Whether or not to Execute App Existence Notification to User on Basis of Notification Score Next, with reference to a flowchart shown in FIG. 19, a description is given to a processing sequence of a process of determining whether or not to execute the app existence notification to the user on the basis of a notification score.

A flow shown in FIG. 19 is a flow in which steps S203*a* and S203*b* are added between steps S203 and S204 of the flow of FIG. 18 described above. Since other processes are similar to the flow of FIG. 18 described above, the added steps S203*a* and *b* will be described.

(Step S203*a*)

In a case where it is determined in steps S202 and S203 that the current context is registered as the cause context in the causal relationship information DB 175, the process proceeds to step S203*a*.

In step S203*a*, the processing execution unit 253 executes notification necessity determination processing based on a notification score.

The notification score is data registered in the user information DB 171 described above with reference to FIG. 7. As descried with reference to FIG. 7, the notification score is a score used for determining whether or not to notify a user of existence of an application.

As described above with reference to FIG. 16, the notification score is registered in the user information DB 171, together with the process of registering a context in which a causal relationship has been recognized into the causal relationship information DB 175.

The notification score is set in a range of 0 to 100, for example, and the score=85 described above indicates setting in which the app existence notification is executed with a probability of 85/100, that is, a probability of 85%. In the notification score recorded in the user information DB 171, a predetermined initial value is recorded, for example, an initial value such as initial score=85. Update is sequentially performed in accordance with user feedback information and the like acquired in the subsequent processes.

In step S203*a*, it is determined whether or not to execute the app existence notification in accordance with a value of the notification score. For example, in a case where the notification score=85, the notification processing is executed with a probability of 85/100. That is, it is determined whether or not to execute the notification with a probability according to the notification score.

(Step S203*b*)

Step S203*b* is branching processing based on an execution necessity determination result of the app existence notification based on the notification score of step S203*a*.

In a case where it is determined to execute the app existence notification, the process proceeds to step S204.

In a case where it is determined not to execute the app existence notification, the process ends. In this case, the existence notification of the app is not performed.

In a case where it is determined to execute the app existence notification, the process proceeds to step S204. Thereafter, in step S204, the processing execution unit 153 determines an application that can be used to generate a result context registered in the causal relationship information DB 175 as correspondence data of the cause context, that is, an application specified by the application ID registered in the causal relationship information DB 175. Further, in step S205, the existence notification of the application is executed to the user. The user is a person who uses the agent device 10.

In a case where the user generates a context that is almost similar to the cause context registered in the causal relationship information DB 175 by this series of processes, the user can know the existence of the app that can be used to generate a result context registered in the causal relationship information DB 175.

Note that, the user who is an execution target of the app existence notification processing is to be basically as follows.

"(A) A User Who has Never Used the Notification Target Application"

However, a configuration may be adopted in which the notification is performed to even "(B) a user who has used the notification target app". Since the agent independently presents the existence of the app, the user can avoid effort of searching for the app and the like.

Furthermore, as described above, the notification score is updated sequentially on the basis of a user's reaction after the application existence notification processing to the user that has been executed by the processing execution unit 153, that is, user feedback information to the app existence notification.

The context analysis unit 152 analyzes a user's situation (a context) after the application existence notification processing, and executes, for example, the following notification score update processing.

(1) After the app existence notification processing, in a case where the user uses the application within a specified time, it is determined that the user's reaction to the app existence notification is positive, and the score update processing for increasing the notification score is performed.

(2) After the app existence notification processing, in a case where the user does not use the application within a specified time, it is determined that the user's reaction to the app existence notification is negative, and the score update processing for lowering the notification score is performed.

(3) After the app existence notification processing, in a case where a negative utterance of the user, such as a user utterance of "noisy", for example, is detected within a specified time, it is determined that the user's reaction to the app existence notification is negative, and the score update processing for lowering the notification score is performed.

The context analysis unit 152 executes, for example, the notification score update processing as described above.

6. About Other Embodiments

Next, other embodiments will be described.
(1) Example of Using User Profile
In the above-described embodiment, a description has been given to a processing example in which the app existence notification processing to the user is determined on the basis of the notification score registered in the user information DB 171.

Moreover, a configuration may be adopted in which the necessity of the app existence notification is determined while taking into account of a user profile registered in the user information DB 171.

For example, in a situation where it is popular to eat pizza while listening to music X in drama A, in a case where a user listening to music X and watching drama A is observed as a context, the existence notification of the pizza ordering application is performed to the user.

(2) Processing Example in Case where there are Multiple Users Who Use One Agent Device 10

In a case where an agent is used in a certain home and there are multiple family members, the processing corresponding to the above-described embodiment is applied individually for each user.

For example, in a case where
a father has ordered pizza through the agent, and
a child does not know that pizza can be ordered through the agent,
the app existence notification is not executed even if the father is looking at a pizzeria leaflet.

If the child is looking at a pizzeria leaflet, the app existence notification is executed for the child.

As the app existence notification to the child, a system utterance is executed such as, for example, "XXX-chan (child's name), you can also order pizza by voice".

(3) Processing Example Using Sensor
In the above-described embodiment, the context analysis processing executed by the context analysis unit 152 can be performed mainly by using a captured image of the image input unit (the camera) 112 and acquired voice of the voice input unit (the microphone) 111, in the input unit 110.

The context analysis is not limited to the process using the captured image of the image input unit (the camera) 112 and the acquired voice of the voice input unit (the microphone) 111. For example, it is possible to use detection information of the sensor 113.

Hereinafter,
a description is given to a processing example using a temperature sensor, which is a component of the sensor 113, and a processing example using a GPS sensor and an acceleration sensor.

(3-1) Processing Example Using Temperature Sensor
For example, suppose there is an application that enables the agent device 10 to execute ON/OFF operation of an air conditioner by voice.

In a case where the context analysis unit 152 detects
"a user who manually turns on the air conditioner"
on the basis of analyzed context information,
in a case where it is determined as a situation in which the air conditioner should be switched ON in accordance with a temperature detected by the temperature sensor, existence notification of an app that enables the air conditioner to be turned ON/OFF by voice is executed.

For example, a system utterance such as
"you can also turn on the air conditioner by voice" is outputted.

FIG. 20 shows an example of context analysis result data obtained as a result of analysis processing by the context analysis unit 152.

The data shown in FIG. 20 is similar to the data described above with reference to FIG. 15 (S24).

That is, it is data, for each user, that associates these three contexts of the earliest Cause context 1, Result context 1 thereof, and Result context 2 in a case where this Result context 1 is Cause context 2.

The context analysis unit 152 and the processing execution unit 153 determine whether or not to execute, to which user, the existence notification of the app on the basis of the context analysis data.

The app is an app that enables ON/OFF operation of the air conditioner by voice.

The app existence notification can be executed in a variety of processing modes such as the following, for example.

Processing Example 1

For a user who has never turned on the air conditioner by using the agent device 10,
in a case where a context [<Result 2> Air conditioner is activated] is observed, the app existence notification is performed at this point.

This notification can increase a possibility that the user will use the app of the agent device 10 at the next activation of the air conditioner.

Processing Example 2

For a user who has never turned on the air conditioner by using the agent device 10,
at a time when [<Cause 1>=Temperature at a timing when the air conditioner is activated] is detected by the temperature sensor, the application existence notification is performed.

For example, the app existence notification can be executed at such a variety of timings.

Note that, the necessity of execution and an execution timing of the app existence notification processing may be determined using, for example, context analysis results of a large number of users obtained through a large number of agent devices connected to the data processing server 21, that is, statistical information.

For example, it is setting such as notifying when a ratio of people who turn on the air conditioner at 28 degrees or higher reaches a threshold value (in a case of setting at 80%).

Figure 21:
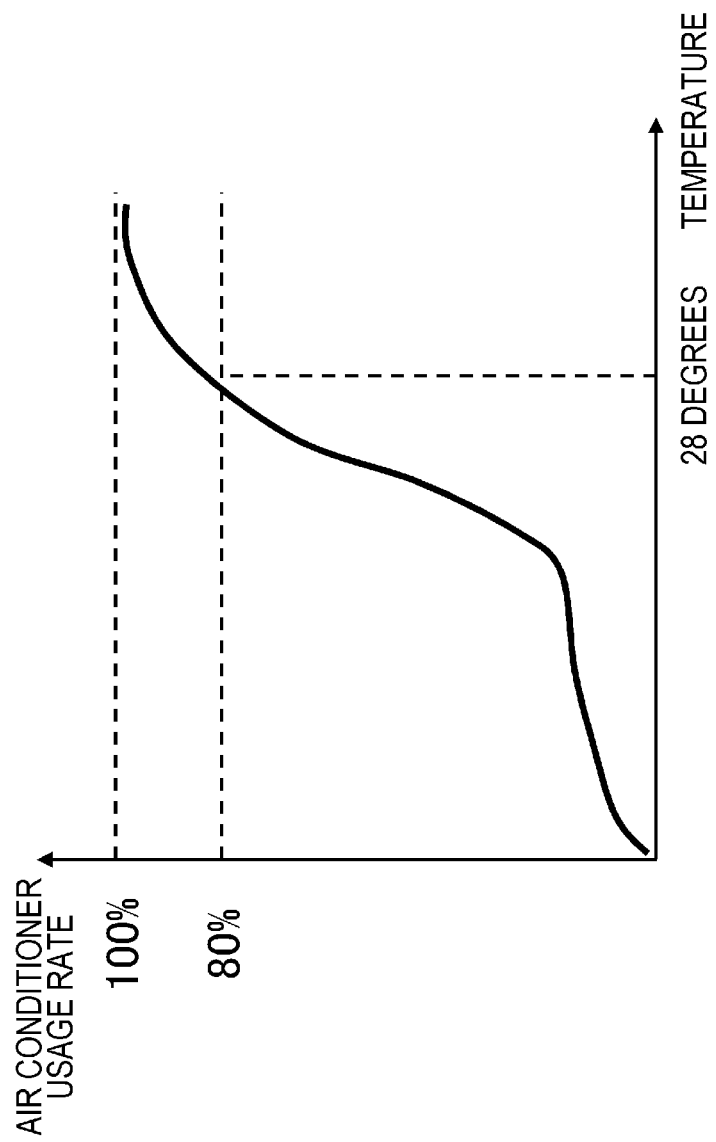
FIG. 21 is a graph for explaining an example of data applied to app existence notification processing using context analysis data using detection information of the temperature sensor.

The context analysis unit 152 generates data shown in FIG. 21 as context analysis results of a large number of users obtained through a large number of agent devices.

The data shown in FIG. 21 is a graph in which a temperature is set on a horizontal axis and an air conditioner usage rate is set on a vertical axis.

This data provides a result that a ratio of people who have turned on the air conditioner at 28 degrees or higher is 80%.

On the basis of this result, the context analysis unit 152 can perform a process such as performing the existence notification of the application to the user at a time when the temperature detected by the temperature sensor reaches 28 degrees.

(3-2) Processing Example Using GPS Sensor and Acceleration Sensor

Next, a processing example using a GPS sensor and an acceleration sensor will be described.

The processing example described below is a processing example in a case of using the agent device while riding in a private car or the like.

Suppose there is an application of the agent device that allows checking of road traffic conditions by voice.

The user has never used this application.

The context analysis unit 152 determines whether or not it is a state where this application should be used on the basis of a context analysis result, and causes the processing execution unit 153 to execute the app existence notification processing in a case where it is determined to be a state where this application should be used. For example, "You can check the road conditions by voice."

FIG. 22 shows an example of context analysis result data obtained as a result of analysis processing by the context analysis unit 152.

The data shown in FIG. 22 is similar to the data described above with reference to FIG. 15 (S24).

That is, it is data, for each user, that associates these three contexts of the earliest Cause context 1, Result context 1 thereof, and Result context 2 in a case where this Result context 1 is Cause context 2.

The context analysis unit 152 and the processing execution unit 153 determine whether or not to execute, to which user, the existence notification of the app on the basis of the context analysis data.

The app is an app that allows checking of traffic conditions by voice.

Furthermore, FIG. 23 shows a result of classifying user types in accordance with contents of the earliest Cause context 1.

Type 1 is a user type including a set of users traveling near Shibuya, analyzed from position information of the GPS sensor.

Type 2 is a user type including a set of users traveling near Shinjuku, analyzed from position information of the GPS sensor.

The app notification can be executed in a variety of processing modes such as the following, for example.

Processing Example 1

For a user who has never checked traffic information using the agent device 10, in a case where [<Result 2> Checking road conditions] is obtained as a context analysis result, the application existence notification is performed for the user at this point.

This notification will be notification for causing the user to use the app next time when checking road conditions.

Processing Example 2

For a user who has never checked traffic information using the agent device 10, at a time when [<Cause 1>=it is determined that checking of the traffic information is useful on the basis of detection information of the GPS position sensor and the acceleration sensor, the application existence notification is performed for the user.

This notification is notification for causing the user to use the app at this time now.

Note that, in this processing example as well, the data obtained by the GPS sensor and the acceleration sensor are numerical data, and it is also possible to have a configuration to perform a process of determining the necessity of notification by using statistical information obtained by analyzing situations of a large number of users, similarly to the process using the temperature sensor described above.

For example, in a case of during movement along the Metropolitan Expressway with acceleration of 10 km/h around 200 m from Shibuya entrance of the Metropolitan Expressway, it is possible to perform a process such as performing the app existence notification when a ratio of people checking the road conditions reaches a threshold value (in a case of setting at 80%).

(4) About Cooperation with App Provider

By using the process of the present disclosure, it is possible to perform existence notification of a variety of apps to the user at an optimum timing. It is expected that this notification processing will increase a usage rate of apps by the user.

Therefore, it is possible to perform business assuming that this app notification processing is an advertisement for apps. For example, it is a mechanism in which, when a user uses an application in accordance with the app existence notification from an agent device, an application provider pays a referral fee to a management company of the agent device.

Furthermore, business seems to be possible in which the management company of the agent device provides and sells context analysis data including a combination of a cause context and a result context analyzed in the above-described embodiment to the app provider.

7. About Hardware Configuration Example of Information Processing Apparatus

Next, a hardware configuration example of the information processing apparatus will be described with reference to FIG. 24.

Hardware described with reference to FIG. 24 is an example of a hardware configuration of the information processing apparatus included in the agent device 10 and the data processing server 21.

A central processing unit (CPU) 501 functions as a control unit and a data processing unit that execute various processes in accordance with a program stored in a read only memory (ROM) 502 or a storage unit 508. For example, the process according to the sequence described in the above-described embodiment is executed. A random access memory (RAM) 503 stores a program executed by the CPU 501 and data. These CPU 501, the ROM 502, and the RAM 503 are connected to each other by a bus 504.

The CPU 501 is connected to an input/output interface 505 via the bus 504, and the input/output interface 505 is connected with an input unit 506 including various switches, a keyboard, a mouse, a microphone, a sensor, and the like, and an output unit 507 including a display, a speaker, and the like. The CPU 501 executes various processes in response to a command inputted from the input unit 506, and outputs a processing result to, for example, the output unit 507.

The storage unit 508 connected to the input/output interface 505 includes, for example, a hard disk or the like, and stores a program executed by the CPU 501 and various data. A communication unit 509 functions as a transmission/reception unit for Wi-Fi communication, Bluetooth (registered trademark) (BT) communication, and other data communication via networks such as the Internet and a local area network, and communicates with an external device.

A drive 510 connected to the input/output interface 505 drives a removable medium 511 such as a magnetic disk, an optical disk, a magneto-optical disk, or a semiconductor memory such as a memory card, and executes data recording and reading.

8. Summary of Configuration of Present Disclosure

The embodiment of the present disclosure has been described in detail with reference to the specific embodiment. However, it is obvious that those skilled in the art can make modifications and substitutions of the embodiment without departing from the scope of the present disclosure. In other words, the present invention has been disclosed in the form of exemplification, and should not be construed as limiting. In order to determine the scope of the present disclosure, the section of the claims should be taken into consideration.

Note that the technology disclosed in this specification can have the following configurations.

(1) An information processing apparatus having:
a data processing unit configured to input user observation information and analyze a context indicating a user situation on the basis of input information, in which
the data processing unit
executes, on the basis of an analysis result of the context, notification processing of an application associated with a context.

(2) The information processing apparatus according to (1), in which
the data processing unit
executes a process of determining presence or absence of a causal relationship between multiple contexts, and registering combination data of multiple contexts determined to have a causal relationship, into a causal relationship information database.

(3) The information processing apparatus according to (2), in which
the data processing unit
executes notification processing of an application associated with a context registered in the causal relationship information database, in a case where a context that is coincident with or similar to a context registered in the causal relationship information database is observed.

(4) The information processing apparatus according to any one of (1) to (3), in which
the data processing unit
executes a process of registering, into the causal relationship information database, a combination of subsequent contexts that are likely to be observed after observation of a context that is observed in advance, as a cause context and a result context having a causal relationship.

(5) The information processing apparatus according to (4), in which
the data processing unit
aggregates observation information of multiple users and selects a cause context and a result context that are determined to have a causal relationship on the basis of an aggregated result.

(6) The information processing apparatus according to (4) or (5), in which
the data processing unit
executes notification processing of an application associated with a context registered in the causal relationship information database in a case where a context that is coincident with or similar to a cause context registered in the causal relationship information database is observed.

(7) The information processing apparatus according to any one of (1) to (6), in which
the data processing unit
executes context analysis on the basis of at least any input information of a camera captured image, a microphone acquired voice, or sensor detection information.

(8) The information processing apparatus according to any one of (1) to (7), in which
the data processing unit
executes context analysis for each user identified by user identification processing.

(9) The information processing apparatus according to any one of (1) to (8), in which
the data processing unit
executes notification processing in which a target user of the notification processing is limited to a user who has no experience of using the application.

(10) The information processing apparatus according to any one of (1) to (8), in which
the data processing unit
executes notification processing without limiting to a user who has no experience of using the application.

(11) The information processing apparatus according to any one of (1) to (10), in which
the data processing unit
determines whether or not to execute notification processing of the application in accordance with setting of a notification score specified in advance.

(12) The information processing apparatus according to (11), in which the notification score is a notification score for each user.

(13) The information processing apparatus according to (11) or (12), in which
the data processing unit
changes a value of a notification score on the basis of a user situation after execution of application notification processing.

(14) An information processing system having a user terminal and a data processing server, in which
the user terminal
has an input unit configured to acquire user observation information, and
the data processing server analyzes a context indicating a user situation on the basis of user observation information received from the user terminal, and transmits notification data of an application associated with a context to the user terminal, on the basis of an analysis result.

(15) The information processing system according to (14), in which the data processing server determines presence or absence of a causal relationship between multiple contexts, and registers combination data of multiple contexts determined to have a causal relationship, into a causal relationship information database.

(16) The information processing system according to (14) or (15), in which the data processing server aggregates observation information of multiple users received from multiple user terminals, selects a cause context and a result context determined to have a causal relationship on the basis of an aggregated result, and registers into the causal relationship information database.

(17) The information processing system according to (15) or (16), in which the data processing server transmits, to the user terminal, notification data of an application associated with a context registered in the causal relationship information database, in a case where a context that is coincident with or similar to a context registered in the causal relationship information database is observed.

(18) An information processing method executed in an information processing apparatus, the information processing method including:

by a data processing unit, inputting user observation information and analyzing a context indicating a user situation on the basis of input information, and executing, on the basis of an analysis result of the context, notification processing of an application associated with a context.

(19) An information processing method executed in an information processing system having a user terminal and a data processing server, the information processing method including:

by the user terminal, acquiring user observation information and transmitting to the data processing server; and by the data processing server, analyzing a context indicating a user situation on the basis of user observation information received from the user terminal, and transmitting notification data of an application associated with a context to the user terminal, on the basis of an analysis result.

(20) A program for causing execution of information processing in an information processing apparatus, the program causing:

a data processing unit to input user observation information and analyze a context indicating a user situation on the basis of input information; and the data processing unit to execute, on the basis of an analysis result of the context, notification processing of an application associated with a context.

Furthermore, the series of processes described in the specification can be executed by hardware, software, or a combined configuration of both. In a case of executing processing by software, a program recording a processing sequence can be installed and executed in a memory in a computer incorporated in dedicated hardware, or a program can be installed and executed in a general-purpose computer capable of executing various processes. For example, the program can be recorded in advance on a recording medium. The program can be installed from a recording medium to a computer, or can be received via a network such as a local area network (LAN) or the Internet, and installed in a recording medium such as an incorporated hard disk.

Note that the various processes described in the specification may be executed not only in a chronological order in accordance with the description, but may also be executed in parallel or individually depending on processing capability of a device that executes the processing or depending on the necessity. Furthermore, a system in this specification is a logical set configuration of a plurality of devices, and is not limited to one in which a device of each configuration is in a same casing.

INDUSTRIAL APPLICABILITY

As described above, according to a configuration of one embodiment of the present disclosure, a device and a method capable of executing notification processing of an application to a user at an optimum timing are realized.

Specifically, for example, user observation information is inputted, a context indicating a user situation is analyzed on the basis of input information, and notification processing of an application associated with a context is executed on the basis of an analysis result. The data processing unit determines the presence or absence of a causal relationship between multiple contexts, registers multiple contexts determined to have a causal relationship into a causal relationship information database, and executes notification processing of an application associated with a database registration context in a case where a context that is coincident with or similar to a cause context registered in the database is observed.

This configuration realizes a device and a method capable of executing notification processing of an application to a user at an optimum timing.

REFERENCE SIGNS LIST

10 Agent device
11 Camera
12 Microphone
13 Display unit
14 Speaker
20 Server
21 External device
110 Input unit
111 Voice input unit
112 Image input unit
113 Sensor
120 Output unit
121 Voice output unit
122 Image output unit
130 Data processing unit
140 Input data analysis unit
141 Voice analysis unit
142 Image analysis unit
143 Sensor information analysis unit
150 Data processing execution unit
151 User identification unit
152 Context analysis unit
153 Processing execution unit
160 Output information generation unit 161 Output voice generation unit
162 Display information generation unit
170 Storage unit
171 User information database (DB)
172 Application DB
173 App usage log DB
174 Context log DB
175 Causal information DB
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing apparatus comprising:
at least one processor configured to:
  input user observation information;
  analyze a context which indicates a user situation based on the user observation information, wherein the user situation is associated with a user;
  determine, based on a specific notification score for the user, whether to execute notification process of an application which is associated with the context;
  execute, based on the analysis of the context and the specific notification score, the notification process of the application which is associated with the context; and
  change a value of the specific notification score based on the user situation after the execution of the notification process of the application.

2. The information processing apparatus according to claim 1, wherein the at least one processor is further configured to:
  determine one of a presence or an absence of a causal relationship between a plurality of contexts, wherein the plurality of contexts include the context; and
  register, into a causal relationship information database, combination data of the plurality of contexts which have the causal relationship.

3. The information processing apparatus according to claim 2, wherein the at least one processor is further configured to:
  execute the notification process of the application, in a case where the analyzed context is similar to a context registered in the causal relationship information database.

4. The information processing apparatus according to claim 1, wherein the at least one processor is further configured to register, into a causal relationship information database, a combination of subsequent contexts of a plurality of contexts as a cause context and a result context, wherein
  the plurality of contexts include the context;
  the combination of subsequent contexts are to be observed after an observation of the context, and
  the combination of subsequent contexts have a causal relationship.

5. The information processing apparatus according to claim 4, wherein the at least one processor is further configured to:
  aggregate observation information associated with a plurality of users, wherein the plurality of users includes the user, and
  select the cause context and the result context that are determined to have the causal relationship based on an aggregated result of the aggregation of the observation information associated with the plurality of users.

6. The information processing apparatus according to claim 4, wherein the at least one processor is further configured to:
  execute the notification process of the application in a case where the context is similar to the cause context registered in the causal relationship information database.

7. The information processing apparatus according to claim 1, wherein the at least one processor is further configured to analyze the context based on at least one of input information associated with a camera captured image, a microphone acquired voice, or sensor detection information.

8. The information processing apparatus according to claim 1, wherein the at least one processor is further configured to analyze the context for the user which is identified by a user identification process.

9. The information processing apparatus according to claim 1, wherein the at least one processor is further configured to execute the notification process in which the user of the notification process processing is limited to a user who has no experience of using the application.

10. The information processing apparatus according to claim 1, wherein the at least one processor is further configured to execute the notification process without limiting to a user who has no experience of using the application.

11. An information processing system, comprising:
a user terminal; and
a data processing server, wherein
  the user terminal is configured to acquire user observation information, and
  the data processing server is configured to:
    analyze a context which indicates a user situation based on the user observation information received from the user terminal, wherein the user situation is associated with a user;
    determine, based on a specific notification score associated with the user, whether to transmit notification data of an application which is associated with the context;
    transmit, based on the analysis of the context and the specific notification score, the notification data of the application associated with the context to the user terminal; and
    change a value of the specific notification score based on the user situation after the transmission of the notification data of the application.

12. The information processing system according to claim 11, wherein the data processing server is further configured to:
  determine one of a presence or an absence of a causal relationship between a plurality of contexts, wherein the plurality of contexts include the context; and
  register, into a causal relationship information database, combination data of the plurality of contexts which have the causal relationship.

13. The information processing system according to claim 12, wherein the data processing server is further configured to transmit, to the user terminal, the notification data of the application, in a case where the analyzed context is similar to a context registered in the causal relationship information database.

14. The information processing system according to claim 11, wherein the data processing server is further configured to:
    aggregate observation information associated with a plurality of users, wherein
    the observation information associated with the plurality of users is received from a plurality of user terminals,
    the plurality of users includes the user, and
    the plurality of user terminals includes the user terminal;
    select a cause context and a result context which are determined to have a causal relationship based on an aggregated result of the aggregation of the observation information associated with the plurality of users; and
    register the cause context and the result context into a causal relationship information database.

15. An information processing method that is executed in an information processing apparatus, the information processing method comprising:
    inputting user observation information;
    analyzing a context which indicates a user situation based on the user observation information, wherein the user situation is associated with a user;
    determining, based on a specific notification score for the user, whether to execute notification process of an application which is associated with the context;
    executing, based on the analysis of the context and the specific notification score, the notification process of the application which is associated with the context; and
    changing a value of the specific notification score based on the user situation after the execution of the notification process of the application.

16. An information processing method executed in an information processing system having a user terminal and a data processing server, the information processing method comprising:
    acquiring, by the user terminal, user observation information;
    transmitting, by the user terminal, the user observation information to the data processing server;
    analyzing, by the data processing server, a context indicating a user situation based on the user observation information received from the user terminal, wherein the user situation is associated with a user;
    determining, by the data processing server, whether to transmit notification data of an application which is associated with the context based on a specific notification score associated with the user;
    transmitting, by the data processing server, the notification data of the application associated with the context to the user terminal based on the analysis of the context and the specific notification score; and
    changing, by the data processing server, a value of the specific notification score based on the user situation after the transmission of the notification data of the application.

17. A non-transitory computer-readable medium having stored thereon, computer-executable instructions which, when executed by a computer, cause the computer to execute operations, the operations comprising:
    inputting user observation information;
    analyzing a context indicating a user situation based on the user observation information, wherein the user situation is associated with a user;
    determining, based on a specific notification score for the user, whether to execute notification process of an application which is associated with the context;
    executing, based on the analysis of the context and the specific notification score, the notification process of the application which is associated with the context; and
    changing a value of the specific notification score based on the user situation after the execution of the notification process of the application.

* * * * *